United States Patent
Hammerschmidt

(10) Patent No.: US 7,310,593 B2
(45) Date of Patent: Dec. 18, 2007

(54) SAMPLING APPARATUS AND METHOD FOR DETERMINING THE DRIVING STATE OF A VEHICLE

(75) Inventor: Dirk Hammerschmidt, Villach (AT)

(73) Assignee: Infineon Technologies AG, Munich (DE)

( * ) Notice: Subject to any disclaimer, the term of this patent is extended or adjusted under 35 U.S.C. 154(b) by 11 days.

(21) Appl. No.: 11/072,099

(22) Filed: Mar. 4, 2005

(65) Prior Publication Data

US 2005/0246142 A1 Nov. 3, 2005

(30) Foreign Application Priority Data

Mar. 4, 2004 (DE) ...................... 10 2004 010 665

(51) Int. Cl.
*G06F 15/00* (2006.01)
*H04B 15/00* (2006.01)
(52) U.S. Cl. ..................................... 702/189
(58) Field of Classification Search ................ 702/189
See application file for complete search history.

(56) References Cited

U.S. PATENT DOCUMENTS

| | | | |
|---|---|---|---|
| 4,197,767 A * | 4/1980 | Leung | 477/98 |
| 5,497,657 A * | 3/1996 | Taguchi et al. | 73/146.2 |
| 5,774,048 A | 6/1998 | Acherholt | 340/447 |
| 7,004,018 B2 * | 2/2006 | Kadota et al. | 73/116 |
| 2004/0254727 A1* | 12/2004 | Ockerse et al. | 701/224 |
| 2005/0057348 A1 | 3/2005 | Hammerschmidt | 340/445 |

FOREIGN PATENT DOCUMENTS

| | | |
|---|---|---|
| DE | 43 03 583 A1 | 8/1994 |
| WO | 03/080371 A2 | 10/2003 |

* cited by examiner

*Primary Examiner*—John E. Barlow, Jr.
*Assistant Examiner*—Jonathan Moffat
(74) *Attorney, Agent, or Firm*—Eschweiler & Associates, LLC

(57) ABSTRACT

An apparatus for determining a state parameter of an object to be monitored comprises a means for providing a plurality of measurement values, wherein the measurement values comprise information relating to the state parameter of the object to be monitored, a comparison means for comparing the measurement value to a predeterminable comparison parameter, wherein the comparison means is formed to output a first comparison signal when a predeterminable number of measurement values falls below the comparison parameter within a measurement interval, or to output a second comparison signal when the predeterminable number of measurement values exceeds or reaches the comparison parameter, wherein the first comparison signal or the second comparison signal indicate the state parameter.

60 Claims, 7 Drawing Sheets

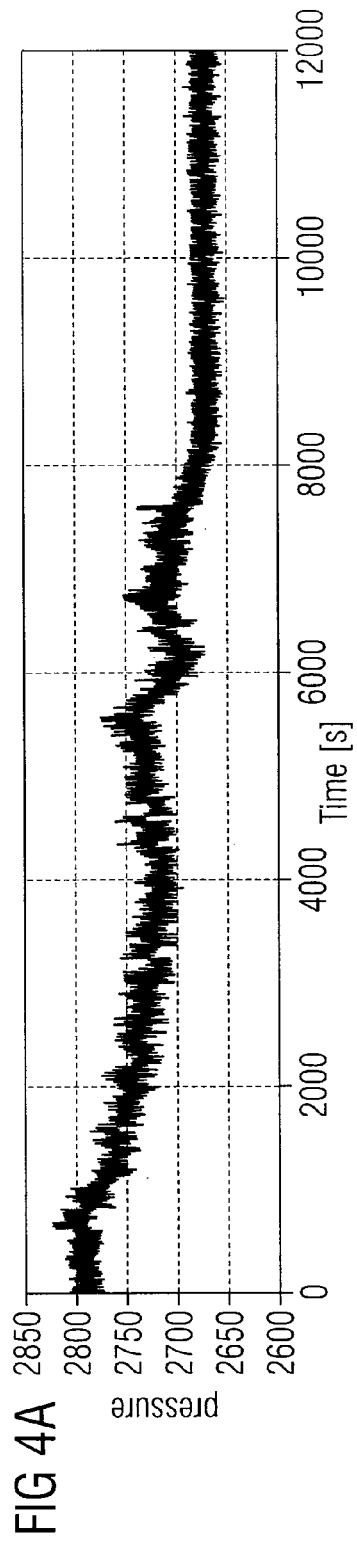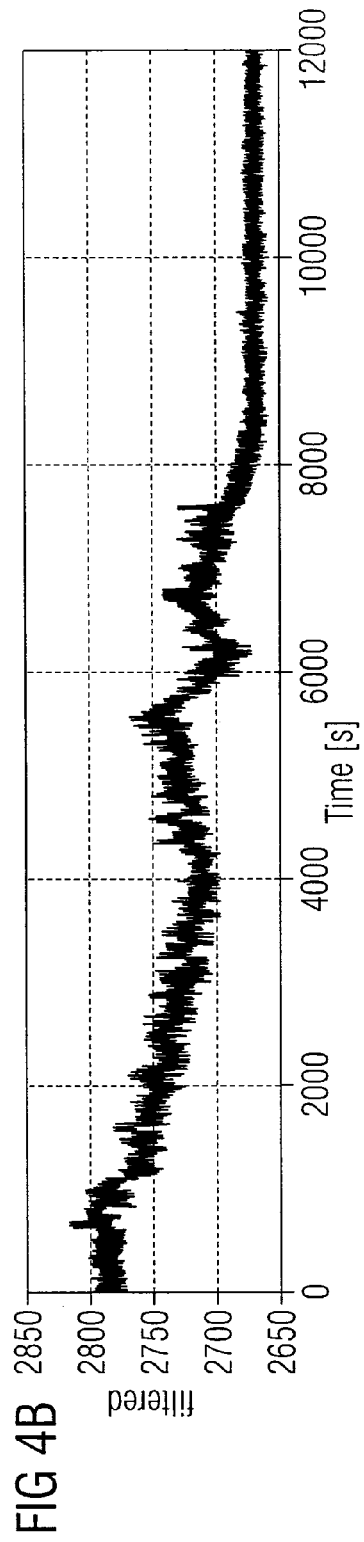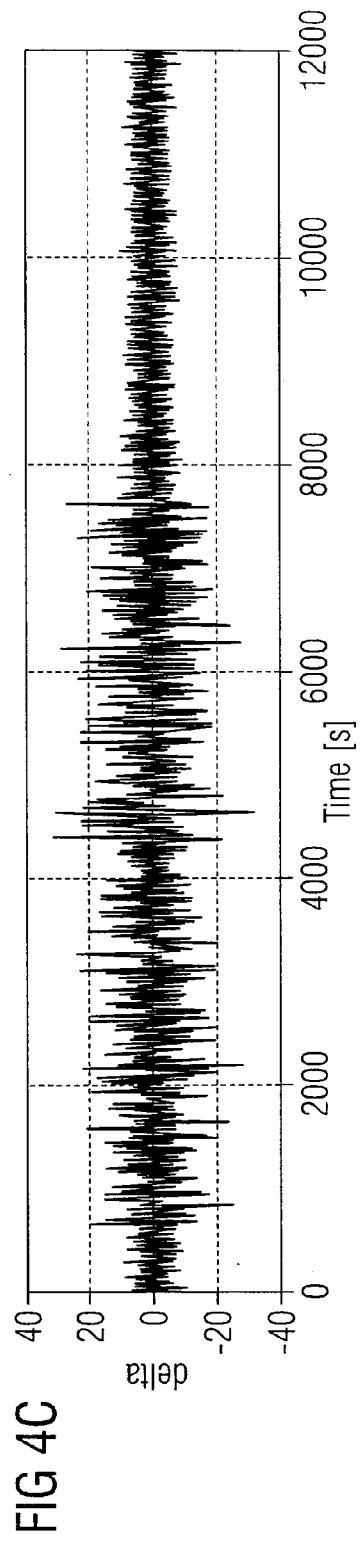

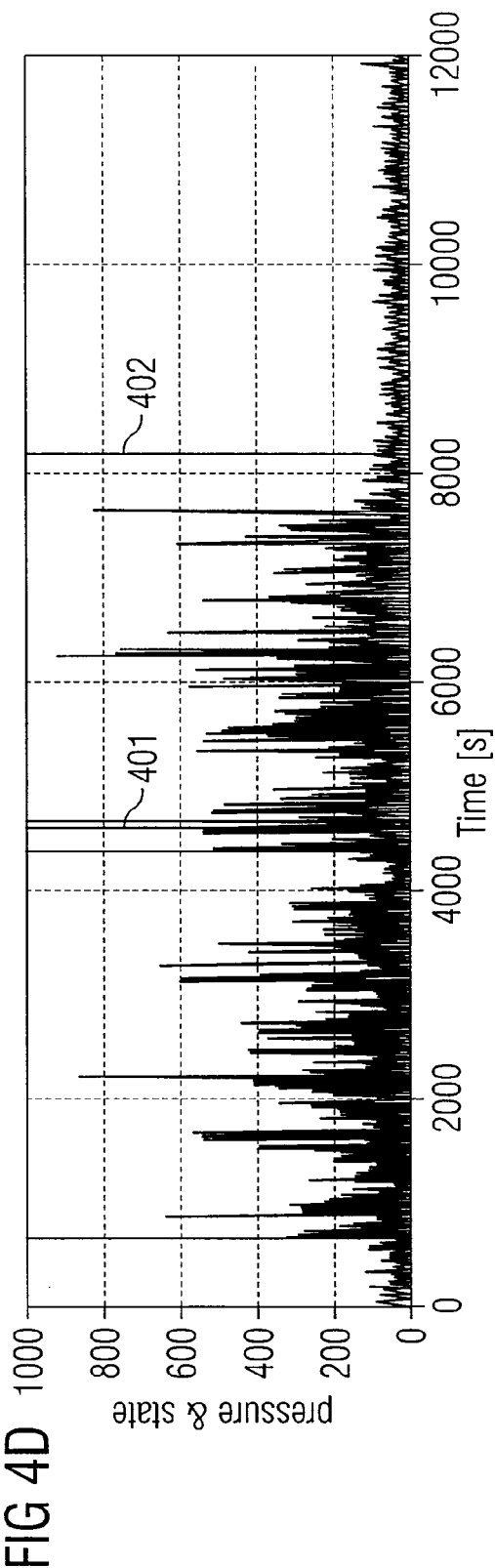
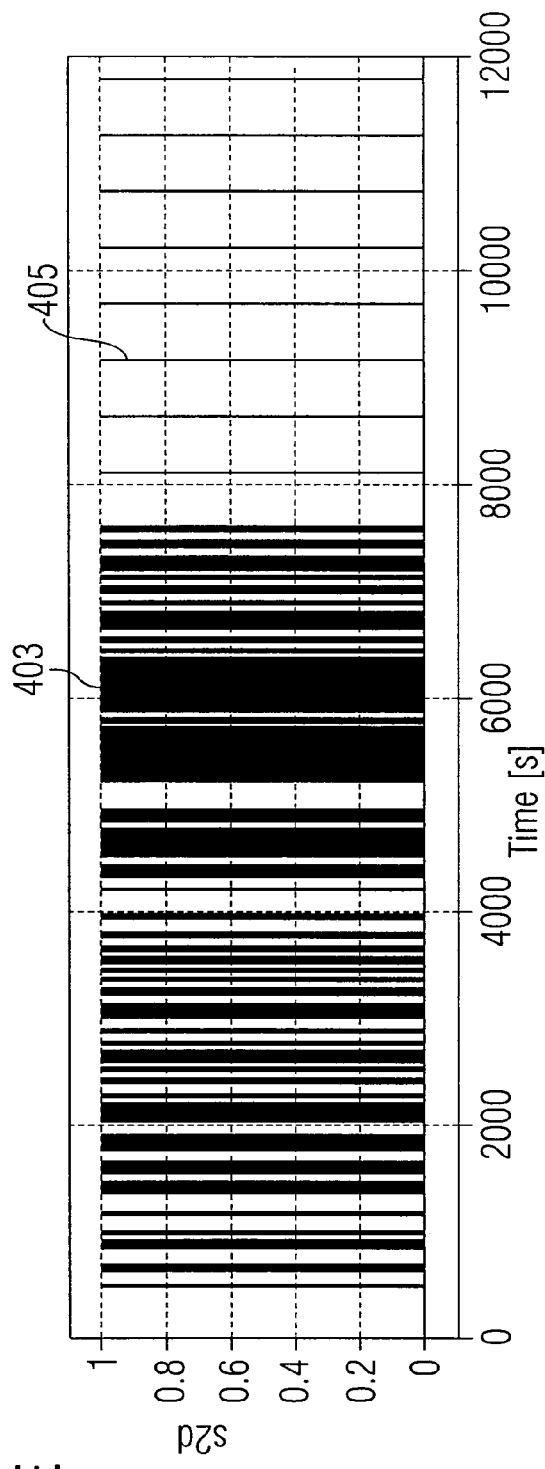

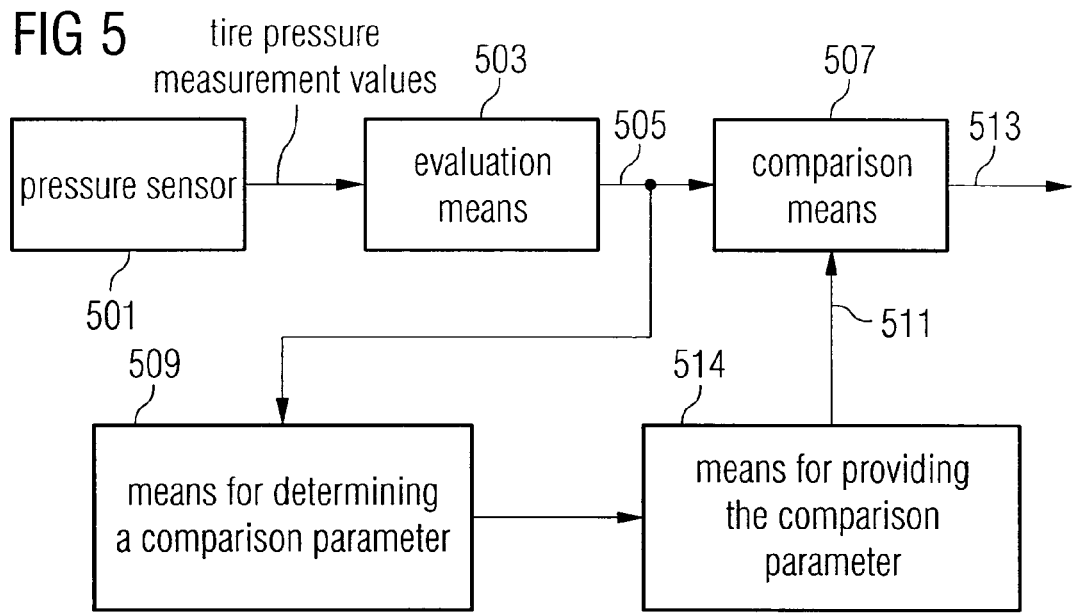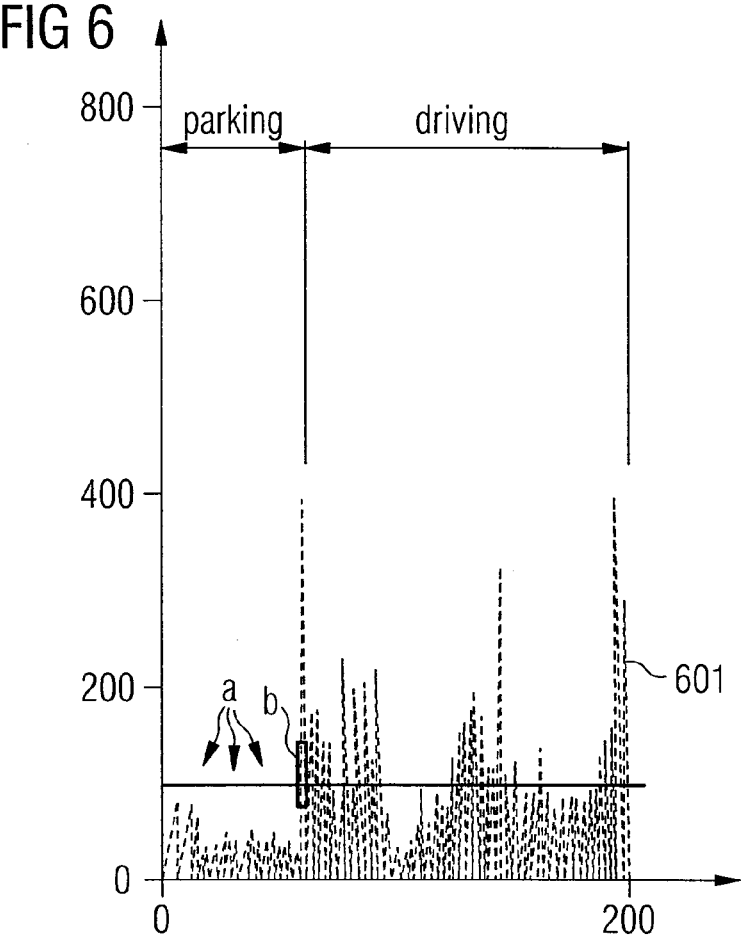

SAMPLING APPARATUS AND METHOD FOR DETERMINING THE DRIVING STATE OF A VEHICLE

CROSS-REFERENCE TO RELATED APPLICATION

This application claims priority from German Patent Application No. 102004010665.7, which was filed on Mar. 4, 2004 and is incorporated herein by reference in its entirety.

BACKGROUND OF THE INVENTION

1. Field of the Invention

The present invention relates to a system for determining a state parameter of an object to be monitored, wherein the state parameter indicates a physical state of the object.

2. Description of the Related Art

In a determination of a state parameter of an object to be monitored, there is often the question of the reliability with which the state parameter has been determined. The state parameter indicating a physical state of the object to be monitored is often determined based on a comparison of measurement data with a threshold. If, for example, the measurement data are noisy, there can be wrong decisions in the determination of the state parameter, so that a possible subsequent decision chain based on an erroneously determined state parameter is also erroneous.

If the object to be monitored is, for example, a vehicle, the state parameter can, for example, be a driving situation of the vehicle, wherein the driving situation comprises, for example, a driving state and a non-operated state.

A determination of a driving situation of a vehicle is of great significance for a plurality of security-relevant aspects. In tire pressure monitoring, for example, a driver can always be informed about the current pressure depending on the determined driving situation (state parameter), so that he can react immediately in case of a pressure drop and can stop the vehicle, for example. Normally, battery-operated pressure sensors are used for measuring and monitoring the tire pressure in a vehicle tire, which transmit their measurement values from the inside of the tire and preferably at the rim via a transmission unit to a central unit, for example a board computer, disposed outside the tire. Due to the required battery operation of the pressure sensor as well as the transmission unit, the life-span of such sensor applications is limited. This problem, however, is not only encountered with the already mentioned tire pressure sensors where a time control for measurement and transmission is performed dependent on pressure or acceleration criteria, but also with any battery-operated sensor systems, such as for separately positionable temperature measurement devices.

Due to the life-span limited by battery operation, it is important to make the decision with as few measurement cycles as possible. Since frequently decision certainties, which are to be higher than the accuracy of an individual measurement with the sensor, are required for decisions, normally, averages of a sequence of repeated measurements are used, or the measurements are taken more frequently than required and then low-pass filtered. However, both approaches increase the power consumption, in the first case in proportion to a number of measurement repetitions and in the second case in proportion to oversampling. At the same time, decisions are to be made as early as possible when the criteria are fulfilled, which results in a minimum frequency of measurements and also a minimum bandwidth of low-passes for noise filtering.

The tire pressure sensor arrangements used in the prior art for monitoring the tire pressure of a vehicle tire have a plurality of disadvantages. With the battery-operated tire pressure sensor configuration, it is not possible to take continuous measurements of the tire pressure measurement values over the whole life-span of the tire pressure sensor configuration, which is in the range of, for example, 10 years. Common tire pressure sensor configurations have too high a power consumption for that, which limits the life-span of the battery-operated tire pressure sensor configurations, so that a continuous measurement of the physical state parameters, such as pressure or temperature, can not be performed with a sufficiently high measurement repetition rate during the whole intended life-span. A sufficient measurement repetition rate is determined by the time interval during which a change of the tire pressure is to be determined, so that the shorter the time interval between the detection of the individual tire pressure measurement values and their transmission to an evaluation electronic, the higher the certainty to detect a dangerous change of the tire pressure, which indicates a critical state of the tire, soon enough.

Additionally, the power consumption of known tire pressure sensor configurations is determined by the associated sensor unit, which serves for transmitting the individual tire pressure measurement values to the central unit, which performs the further processing of the transmitted tire pressure and tire temperature values, respectively. In the so far most common tire pressure sensor configurations, the measurement frequency for detecting the tire pressure measurement values and the transfer frequency (abundance) for transmitting the tire pressure measurement values are adapted in dependence on the driving state of the vehicle detected via an additional acceleration sensor or an additional motion switch.

In order to detect pressure changes of the tire pressure, which indicate damage of the tire, as soon as possible, in the tire pressure sensor configurations known in the prior art it is further required to perform a significantly continuous measurement of the pressure and temperature values in the tire in dependence on the detected driving state of the vehicle and transmit these to the central unit across a high-frequency radio link. Thus, the relatively high turn-on frequency of the transmission unit in the known tire pressure sensor configurations leads to a relatively high average power consumption of the battery-operated configuration, which has the consequence that the intended life-span of, for example, 10 years, cannot be achieved.

WO 03/080371 A2 describes, for example, a tire pressure monitoring system, where tire pressure measurement values, which are successive in time, are detected by a transmission unit for monitoring the tire pressure in a tire of a vehicle. At least part of the tire pressure measurement values is transmitted with a variable frequency to a receiver unit, wherein the frequency is derived from the detected tire pressure measurement values via a control unit.

The above-described approach according to the prior art utilizes the fact that dynamic load redistributions occur during a driving operation of the vehicle, which leads to a change of pressure in the tires. For example in a bend, the outer wheels are more heavily loaded and consequently the pressure in these tires increases, while it decreases in the relieved wheels on the inside of the bend. The same takes place during braking or accelerating between the wheels of the rear axle and the front axle. Thereby, the transmission and measurement intervals of the tire pressure sensor system are determined by the measured tire pressure itself. For switching between a driving state and a non-operated state, switching thresholds are used, which are adapted both in the non-operated state and in the dynamical driving state, so that, for example, static pressure conditions in the tire, as they occur, for example, during parking, and dynamic driving conditions are always taken into consideration.

In the determination of the state parameter, such as the already mentioned driving situation of the vehicle, this is of particular importance for battery-operated sensor systems where the measurement values are transmitted, for example, only in the driving state. Here, a wrong decision for tranmitting measurement data causes a straining transmission process with high current consumption, while a wrong decision for not transmitting merely causes a short delay of the transmission process.

If, for example, systems are used, which additionally use an acceleration sensor to determine the driving state of the vehicle, the measurement rate and particularly the number of heavily current-consuming RF transmissions can be reduced significantly in the non-operated state compared to the driving state. However, the acceleration sensor has to be evaluated continuously in order to determine when the driving state changes and thus the measurement and transmission rates have to be changed. It applies for the frequency of checking the acceleration sensor that it has to be checked at least so frequently that a time is kept, which is available for detecting the change of the driving state.

In simple mechanical acceleration sensors where a mass is shifted against, for example, a counter-force defined by a spring by the acceleration and closes a contact at a certain point of its path, monitoring this switch represents no significant current consumption, because a signal-noise ratio of the switching signal is so high that it can be monitored continuously by a simple Schmitt trigger at the input. However, for reliability reasons, these switches are replaced by micromechanical acceleration sensors, the signals of which often have to be read out with the help of amplifiers and/or A/D converters. Here it applies that an energy consumption of the evaluation circuit increases with increasing demands on accuracy. Examples for the causes are an extension of the measurement length for measurement repetition and averaging, an increase of the sampling frequency and downstream low-pass filtering, an increase of current consumption for a more low-noise input stage or an extension of the measurement time for a measurement value with an input circuit with lower bandwidth.

If, for example, gas pressure is monitored instead of the acceleration, the measurement data is further processed and transmitted from the tire to a receiver in the vehicle. However, a large part of the data is also measured only for a derivation of decisions. For an accuracy with which this decision can be made, the same influences apply, which have been described above for the acceleration sensor.

SUMMARY OF THE INVENTION

It is an object of the present invention to provide an improved concept for energy-efficient and reliable determination of a state parameter of an object to be monitored.

In accordance with a first aspect, the inventive apparatus for determining a state parameter of an object to be monitored has a means for providing a plurality of measurement values, wherein the measurement values have information relating to the state parameter of the object to be monitored, a comparison means for comparing the measurement values with a predeterminable comparison parameter, wherein the comparison means is formed to output a first comparison signal when a predeterminable number of measurement values within a measurement interval falls below the comparison parameter, or to output a second comparison signal when the predeterminable number of measurement values exceeds or reaches the comparison parameter, wherein the first comparison signal or the second comparison signal indicate the state parameter.

In accordance with a second aspect, the present invention provides method for determining a state parameter of an object to be monitored, having the steps of: providing a plurality of measurement values, wherein the measurement values have information relating to the state parameter of the object to be monitored; comparing the measurement values to a predeterminable comparison parameter to generate and output a first comparison signal when a predeterminable number of measurement values within a measurement interval falls below the comparison parameter or to generate and output a second comparison signal when the predeterminable number of measurement values reaches or exceeds the comparison parameter, wherein the first comparison signal or the second comparison signal indicate the state parameter.

In accordance with a third aspect, the present invention provides A computer program with a program code for performing the method for determining a state parameter of an object to be monitored, having the steps of: providing a plurality of measurement values, wherein the measurement values have information relating to the state parameter of the object to be monitored; comparing the measurement values to a predeterminable comparison parameter to generate and output a first comparison signal when a predeterminable number of measurement values within a measurement interval falls below the comparison parameter or to generate and output a second comparison signal when the predeterminable number of measurement values reaches or exceeds the comparison parameter, wherein the first comparison signal or the second comparison signal indicate the state parameter, when the computer program runs on a computer.

In accordance with a further aspect, the present invention provides an apparatus for determining a driving situation of a vehicle, wherein the driving situation comprises a non-operated state and a driving state of the vehicle, with a pressure sensor for detecting tire pressure measurement values, an evaluation means for evaluating a plurality of tire pressure measurement values to obtain a tire pressure-dependent driving situation parameter, a means for determining a comparison parameter from the tire pressure-dependent driving situation parameter, a means for providing the comparison parameter, wherein the means for providing is coupled to the means for determining to obtain the comparison parameter, a comparison means for comparing the tire pressure-dependent driving situation parameter with the comparison parameter to determine the driving situation, wherein the means for providing the comparison parameter is formed to provide the comparison parameter to the comparison means and to maintain the comparison parameter in successive determinations of the driving situation during the driving state.

The present invention is based on the knowledge that a state parameter can be determined in an energy-efficient and reliable way based on a comparison of measurement values with one or several comparison parameters (thresholds), if a minimum number of measurement values, which are to fall below and exceed the predeterminable comparison parameter, respectively, is determined or preset before, to make a reliable decision about the state parameter and a change of the state parameter, respectively.

If the state parameter is a driving situation of a vehicle, the state parameter can, for example, indicate a non-operated state of the vehicle or a driving state of the vehicle. As has already been mentioned, the state parameter is determined based on a comparison parameter. The comparison parameter is preferably determined from the measurement values and can either be determined or adapted continuously, i.e. both in the non-operated state and in the driving state, and also only during the non-operated state, wherein in the latter case a further reduction of the energy consumption of the inventive system results. A further reduction of the energy consumption results from the fact that according to the invention only as many comparisons are performed as are absolutely necessary. If the state parameter determined in the non-operated state is compared to the measurement values, it can be determined that the vehicle is in the non-operated state, for example, when the measurement values do not exceed the comparison parameter. When the comparison parameter is exceeded, however, a dynamic driving state is determined. In dependence on a degree of the exceeding a dynamic in the driving state can be detected clearly, such as a slower drive or a fast drive.

According to the invention, the comparison parameter can be used in successive determinations of the driving situation, particularly during the driving state. Preferably, no further adaption (tracking) of the comparison parameter takes place. In a determined non-operated state of the vehicle, the comparison parameter can be adapted in order to detect, for example, statistical measurement variations during the parking operation, which are mainly determined by the noise of the sensor and the circuits for evaluating the sensor.

Further, the inventive concept is based on the fact that the pressure changes in a tire to be expected in a driving operation typically have a dynamic of a few seconds due to a duration of typical driving situations. However, such pressure changes are not to be expected in the parking state (non-operated state), since the pressure in an intact tire generally varies only due to temperature changes and thus has a much lower dynamic in a range of minutes or even hours. If the pressure changes are suitably evaluated, a decision can be made without an acceleration sensor or another roll detector, about which situation (driving situation) the vehicle is in. The inventive comparison parameter is "frozen" between the state of the quasi-static tire changes in a parked vehicle and the dynamic pressure changes in the driving operation, when a change to the dynamic state is made. Resetting into the quasi-static state of operation is performed as a reverse of the opposite switching process, which means when the conditions for the dynamic state, which are monitored with the "frozen" threshold, are no longer fulfilled.

The inventive approach has the advantage that the energy consumption is further reduced, since the comparison parameter is only determined in the non-operated state and not continuously, i.e. both in the driving operation and the parking state. Thus, an adaption result is foreseeable and can be tested for its plausibility, since the result cannot be influenced by a traffic situation, road and weather conditions, the style of driving and/or the mood of the driver, the tire types and the vehicle weight as well as a chassis tuning. Additionally, a further reduction of the energy consumption and thus a further increase of the battery life-span can be obtained, since the switching thresholds are not adapted continuously, i.e. independent of a driving situation, such as non-operated state or driving operation, but only in the parking state, which leads to a reduction of the energy consumption.

Due to the further reduction of the energy consumption of the inventive system, measurements of the tire pressure can be ensured over the whole life-span of a tire pressure sensor system, e.g. in the range of 10 years, with only one battery. This is due to the fact that a frequency of pressure measurements as well as a time interval required for pressure measurement can be specifically influenced.

It is a further advantage of the present invention that no additional acceleration sensor or motion switch has to be used for detecting the driving state of the vehicle for detecting the driving situation, the evaluation of which leads again to an increased current consumption.

It is a further advantage of the present invention that data indicating tire pressures can be transmitted regularly and with a minimum frequency, e.g. hourly, to the central unit to allow monitoring of the functionality of the tire pressure sensor for the central unit. The minimum frequency can further be adjusted adaptively so that the data transmission only takes place when, for example, a significant pressure change occurs.

It is a further advantage of the present invention that the switching threshold (the comparison parameter) is only adapted in the parking state. For tat reason, the inventive switching threshold does not depend on the driving dynamic of the vehicle, the style of driving of the driver, the road and route conditions or the type of tire or tire pressure, but changes merely in dependence on the noise present in a stationary vehicle. This parameter can be easily predicted and depends only on switching properties, whereby a dimensioning of the system is significantly eased, which will lead to cost reduction. Additionally, the inventive system is easier to test since the inventive switching threshold occurs also in a production test under normal environmental pressure and can thus be measured again prior to delivery.

It is a further advantage of the present invention that merely one switching threshold (a comparison parameter) is used to differentiate between driving state and non-operated state. Apart from a simplification of a circuit complexity, it is achieved that the inventive switching threshold does not depend on individual driving characteristics and vehicle types as well as tire types, but merely on the characteristics of the sensor system which are known during the production of the sensor system and can thus be used for determining plausibility checks, such as minimum and maximum limits of the comparison parameter.

It is a further advantage of the present invention that a decision, which occurs rarely and which is to be made with high reliability, can be derived from a relatively noisy signal without continuously having to perform an increased number of measurements for noise filtering or without having to set circuit parameters for decreasing the noise, such that, for example, an increased current consumption results. Further, the measurement intervals can be adapted to the maximum allowable decision delays without considering boundary conditions, which the noise of the measurement system dictates, and are only temporarily reduced for a few repetition measurements during exceeding a decision criterion due to noise, which leads to a further reduction of the energy consumption.

BRIEF DESCRIPTION OF THE DRAWINGS

These and other objects and features of the present invention will become clear from the following description taken in conjunction with the accompanying drawings, in which:

FIG. 4a-e are exemplary curves of the average tire pressure and of parameters derived from the determined tire pressure, which are used according to the invention for deriving a state parameter, which is a driving situation of a vehicle;

FIG. 5 is a basic block diagram for determining a state parameter of an object to be monitored according to a further embodiment of the present invention;

FIG. 6 is a simulation image representing a derivation of the states "driving" or "non-operated";

DESCRIPTION OF THE PREFERRED EMBODIMENTS

Figure 1:
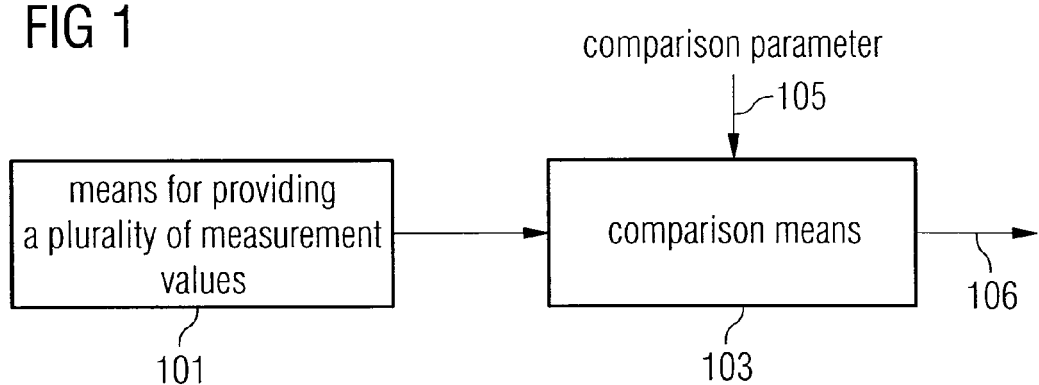
FIG. 1 is a basic block diagram of an inventive apparatus for determining a state parameter of an object to be monitored.

The apparatus for determining a state parameter of an object to be monitored illustrated in FIG. 1 comprises a means 101 for providing a plurality of measurement values, wherein the measurement values provide information relating to the state parameter of the object to be monitored. The means 101 for providing has an output coupled to an input of a comparison means 103. Further, the comparison means 103 has a further input 105, to which a comparison parameter can be applied, as well as an output 106 for providing a first comparison signal and/or a second comparison signal.

The comparison means illustrated in FIG. 1 is formed to compare the measurement values provided by the means 101 for providing with a predeterminable comparison parameter. Thereby, the means for comparing 103 is formed to output a first comparison signal when a predeterminable number of measurement values within one measurement interval falls below the comparison parameter, or to output a second comparison signal when the predeterminable number of measurement values exceeds or reaches the comparison parameter, wherein the first comparison signal or the second comparison signal indicate the state parameter.

The means 101 for providing the plurality of measurement value comprises a sensor means, such as a tire pressure sensor for providing tire pressure measurement values or an acceleration sensor for providing acceleration measurement values, wherein the tire pressure measurement values or the acceleration measurement values can be the measurement values.

In the following, for the purpose of simplifying the specification, it is assumed that the measurement values can be tire pressure measurement values. Here, it should be noted, that the measurement values can also be acceleration measurement values or other measurement values, such as the temperature of the gas filling of the tire, the chemical composition of the gas filling, etc., which are obtained via a temperature sensor, a chemosensor, etc.

According to a further aspect, the inventive means 101 for providing the measurement values comprises an evaluation means for evaluating the plurality of tire pressure measurement values to provide evaluated measurement values.

According to a further embodiment, for determining the evaluated measuring values, the inventive evaluation means comprises a means for determining an average value of the plurality of measurement values as well as a subtracter for determining a difference between the measurement values and the average value, wherein the evaluated measurement values are the difference or an amount of the difference. The means for determining the average value can, for example, have a low-pass filter to determine the average value by low-pass filtering.

According to a further embodiment, the evaluated measurement values can be determined merely from a difference between successive measurement values. In that case, the inventive evaluation means comprises a subtracter for determining a difference between successive measurement values, wherein the evaluated measurement values are the difference or an amount of the difference.

According to a further embodiment, the inventive evaluation means comprises a squaring means for squaring the above-mentioned difference or an amount of the difference to obtain a squared difference, wherein the evaluated measurement values are the squared difference.

The comparison means 103 receives the plurality of measurement values or a plurality of processed measurement values or both from the means 101.

According to a further aspect, the inventive apparatus for determining the state parameter comprises a means for determining a predeterminable comparison parameter, wherein the means for determining is formed to provide the predeterminable comparison parameter to the comparison means 103.

The means for determining the comparison parameter is, for example, formed to determine an average value of the evaluated measurement values, wherein the average value of the evaluated measurement value is the predeterminable comparison parameter. For determining the average value, the means for determining the comparison parameter comprises, for example, a low-pass filter to determine the average value of the measurement values by low-pass filtering the same. The cutoff frequency of the filter for determining the comparison parameter can differ from the cutoff frequency of the filter for processing the measurement values in the means for providing the measurement values. Typically, the cutoff frequency of the filter for determining the comparison parameter is lower.

Additionally, the inventive means for determining the comparison parameter can be formed to output a plurality of the comparison parameter or a fraction of the comparison parameter as the predeterminable comparison parameter. Thereby, for example, an average value of the measurement values (and the processed measurement values, respectively) is multiplied by a factor so that plurality of the average value is provided to the comparison means 103 as comparison parameter. Analogously, the inventive means for determining a comparison parameter can be formed to output a fraction of the determined comparison parameter as the comparison parameter. Thereby, for example, the determined average value of the measurement values is evaluated with a factor in a multiplicative way, wherein the factor is smaller than 1. In that way, by staggering the plurality as well as the fractions of the predeterminable comparison parameters, which are defined as switching borders, additional states can be defined, such as non-operated state, driving state with low dynamic, driving state with high dynamic and alarm state, for example in an unexpectedly high pressure drop.

According to the invention, the comparison means 103 is formed to use the comparison parameter, which is determined, for example, in a non-operated state of a vehicle, in successive determinations of the driving situation during the driving state. To obtain a further power consumption reduction, according to the invention, the comparison parameter is only determined when, for example, the first comparison signal indicates the non-operated state. Thus, the inventive means for determining the comparison parameter can be controllable so that the comparison parameter is preferably only determined if, for example, the non-operated state has been determined, and that an adaption of the comparison parameter is interrupted if, for example, the second comparison signal indicates the driving state. According to the invention, a control means is used for controlling the means for determining the comparison parameter, which is formed to generate a first control signal in response to which the means for determining the comparison parameter determines the comparison parameter and to generate a second control signal in response to which the means 109 for determining the comparison parameter interrupts a determination, i.e. an adaption, of the comparison parameter.

Preferably, the inventive control means is formed to derive the first control signal and the second control signal from the first or from the second comparison signal. If, for example, the first comparison signal indicates a non-operated state, and the second comparison signal, for example, a driving state, the first control signal is generated, for example, when a non-operated state is indicated. Analogously, the second control signal is generated when the driving state is indicated. Basically, the control means is formed to output the first control signal when the first and/or the second comparison signal indicates the non-operated state and to output the second control signal when the first and/or the second comparison signal indicates the driving state, since the driving state to be indicated can be associated to the first or to the second comparison signal. For example, when the second control signal (driving state) occurs, the adaption of the comparison parameter can be terminated while it will be performed when the first control signal (parking state) is present.

According to a further embodiment, the means for determining the comparison parameter can also be controlled directly based on the first comparison signal or the second comparison signal. Therefore, for example, the output 106 of the comparison means can be coupled back to the means for determining the comparison parameter to control its operation.

According to a further embodiment of the present invention, the means 101 for providing a plurality of measurement values comprises a measurement sensor, wherein the measurement sensor is, for example, a tire pressure sensor or a acceleration sensor. For the case that the state parameter is a driving situation of the vehicle, comprising a non-operated state and a driving state, the inventive measurement sensor has a first measurement rate in the non-operated state and a second measurement rate in the driving state, wherein the first measurement rate and the second measurement rate differ. Since, for example, in a non-operated state the pressure changes are lower than in a driving state, the first measurement rate is preferably lower than the second measurement rate, whereby a further reduction of the energy consumption is obtained. Thus, in the non-operated state, a time interval between two successive measurements can be, for example, in a range between 1 second and 10 seconds. In comparison, the measurement rate is increased in the driving state, so that the second measurement rate is, for example, in a range of 0.1 seconds to 1 second.

Controlling the pressure sensor with regard to the measurement rate can, for example, be performed in dependence on the respectively indicated driving state. The inventive apparatus for determining the state parameter can therefore, for example, have a further control means, which is formed to derive a pressure sensor control signal from the first comparison signal or the second comparison signal, based on which the respective measurement rate is set.

Additionally, the inventive apparatus for determining the state parameter can have a transmitter for transmitting the first comparison signal and/or the second comparison signal, for example to a central unit disposed in the vehicle, which informs the driver about the current pressure curve, for example based on the received first and/or second comparison signal. The transmitter can, for example, be a radio transmitter, so that communication between the inventive apparatus for determining the driving situation and the central unit can be performed wireless.

According to the invention, the gas pressure in the tires can be measured in time intervals, which are, for example, shorter than the time interval aimed at for detecting the transition between, for example, a non-operated state and a driving state. From the successive pressure measurements, an average value of the pressure curve is formed by filtering. The average value can, for example, be a short-term average value, indicated by the fact that only a few pressure measurement values are used for its determination. A difference to the average value is formed from every measurement value, wherein the differences are then squared. According to the invention, the squares of the differences are again filtered to determine an average value of the squared deviations. The average value of the squared deviations can again be a short-term average value. The cutoff frequency of the filter for determining the average value of the squared deviations can differ from the cutoff frequency of the filter for determining the average value of the pressure measurement values for the difference formation. Typically, the cutoff frequency of the filter for determining the average value of the squares deviation, which is used as comparison parameter, is lower.

There is, for example, a transition from an operated state to a driving state when a predetermined number of exceedings of the current difference square over a predetermined multiple of the short-term average values of the difference of the squares, e.g. 5, occurs within a predetermined number of measurements. In this transition, filtering of the difference squares is terminated and the last short-term average value of the difference squares is maintained as comparison parameter. There is, however, a change from a driving state to a non-operated state when the switching condition from the non-operated state to the driving state is not fulfilled within a predetermined number of measurements. After switching back to the non-operated state, filtering of the difference squares to an adaption of the switching threshold (comparison parameter) is activated again. Thereby, the fact that the switching and environment parameters influencing the adaption behavior do not significantly change in a parking operation is utilized, so that for a long time, for example, the same pressure sensor is used, whereby a sensor-typical plausibility check becomes possible. The predetermined number of measurements for switching from the parking state to the driving state and vice versa are not necessary equal. Typically, the number of measurements for switching from the driving state to the parking state is significantly higher than the number of measurements for switching from the parking state to the driving state.

According to a further embodiment, in addition to the current tire pressure, further information can be provided, which can only be calculated when measurements are taken in constant time intervals. Examples therefor are low-pass filtered pressure values or moving average values, a deviation of the measurement from the previous value or a low-pass filtered or averaged value or measured values for gradients of variations of the measurement values across a monitoring time interval of, for example, one minute.

According to the invention, the measurement times in the driving state can differ from the ones in the non-operated state. As has already been mentioned, this can be easily controlled because an adaption of the switching thresholds (comparison parameter) is only performed in one of the two states. As has already been mentioned, the pressure difference can be obtained directly from two successive pressure measurements, without having to form an average value (for example a short-term average value). Analogously, instead of the difference squares, difference amounts can be used, which are output as the first comparison signal or the second comparison signal. The multiple of the short-term average value is, for example, limited by a maximum value to ensure that high pressure deviations, which are not plausible in a non-operated state, always lead to a transition to the driving state. The multiple of the short-term average value is, for example, limited by a minimum value to ensure that pressure deviations which are clearly too low for a driving state can not lead to an unnecessary transition to the driving state. The frozen value of the short-term average value and the difference squares (comparison parameter) is adapted to the proportionality of the thermal noise by temperature compensation. The thermal noise is the significant portion that can cause measurement differences in the non-operated state. The temperature compensation is thereby adapted to the absolute temperature. This means that in a temperature rise the switching threshold (comparison parameter) that is defined by the transition from the non-operated state to the driving state, is also increased to make the switching condition independent of the temperature.

If the state parameter is, for example, the already mentioned driving situation of a vehicle, which comprises a non-operated state and a driving state, it has already been mentioned that the predeterminable comparison parameter is preferably determined or substantially used mainly in the non-operated state in order to save energy. According to a further aspect, the inventive apparatus for determining the state parameter comprises a means for providing the predeterminable comparison parameter, which is used as interface between the means for determining the comparison parameter and the comparison means. Thereby, the means for providing is formed to maintain the predeterminable comparison parameter (comparison parameter) at the current value of the same, when the first comparison signal or the second comparison signal indicates a transition between the non-operated state and the driving state. That way, it can be ensured that, for example in a deactivation of the means for determining the comparison parameter the same will not get lost.

In order to make a decision about the first comparison signal or the second comparison signal, the inventive comparison means is formed to perform a plurality of comparisons within the measurement interval, wherein the first comparison signal is generated when the predeterminable number of measurement value within the measurement interval falls below the comparison parameter, and wherein the second comparison signal is generated by the comparison means when the predeterminable number of measurement values reaches or exceeds the comparison parameter. Thus, the measurement interval is determined by a measurement number, i.e. by the plurality of measurement values within the measurement interval.

According to a further aspect, the inventive apparatus for determining a state parameter comprises a means for determining the number of measurement values. The means for determining the number of measurement values is, for example, formed to determine the number of measurement values by using a maximum allowable error probability, wherein the maximum allowable error probability indicates a maximum allowable probability of a wrong decision about the first comparison signal or about the second comparison signal from the plurality of comparisons, wherein the plurality of comparisons is equal to or smaller than the number of measurement values. Preferably, the means for determining the number of measurement values is formed to determine the number of measurement values n by using the following equation:

$$n = \log(p_{e1})/\log(p_{emax}),$$

wherein $\log(p_{e1})$ is the logarithm of an error probability $p_{e1}$ of a measurement value, and wherein $\log(p_{emax})$ is the logarithm of the maximum allowable error probability $p_{emax}$.

Here, use is made of the fact that the signal of, for example, a pressure or an acceleration sensor in the tire of a parked vehicle is subject to merely very low variations by a change of temperature and the noise of the measurement configuration caused by the system. In most cases, it can be assumed for the noise that it is a band-limited white noise. The measurement rates in the systems will always be in the range of several Hertz (Hz) due to the requirement to save energy, wherein the bandwidth of the white noise can be expected to be many powers of ten higher. In this constellation, the noise is heavily subsampled and almost the whole noise energy lies in frequency ranges far above the Nyquist frequency of the sampling system. Under these conditions, two successive measurements can be considered as uncorrelated in good approximation.

In this case, it holds true that the probability of multiple random exceedings of a threshold, i.e. for example the (wrong) detection of a driving state although the vehicle is still parked is equal to the product of the individual probabilities for uncorrelated random events. If the system is dimensioned such that the switching threshold (comparison parameter) is at several multiples of the standard deviation, a probability of 0.3% results that a measurement value will trigger a wrong decision because it falls across the threshold due to the noise, for example, for a switching threshold at three times a standard deviation by assuming a Gaussian random process. The probability that this happens three times in a row is at, for example, $(0.3\%)^3 = 27$ ppm based on the assumption that the individual measurements are uncorrelated.

The inventive system has a switching threshold (comparison parameter), during the undershooting and exceeding of which an action is triggered, such as the transmission of measurement data towards the outside or a change of a system-internal state, which again results in an increase of the sampling rate. This switching threshold can be determined adaptively or can be altered by a timer in a time-dependent way. The noise caused by the sensor system, which comprises, for example, the pressure sensor, and its characteristic are known, which results in an error probability ($p_{e1}$) for the individual measurement. In order to make a decision with the predetermined maximum allowable error probability ($p_{emax}$), a repetition number is calculated, which results as a rounded-up integer quotient of the logarithm of the two error probabilities. The repetition number is a number of the comparison repetitions, which is predetermined by the already mentioned number of measurement values. If a decision criterion is fulfilled, a decision is repeated. If the decision is not the same in the repetition, the decision is discarded and repetitions are terminated. If the decision is the same in the repetition, the repetition is continued until n repetitions with the same result are present, and only then the decision about the state parameter is finally made. The error probability for the n-fold decision is then:

$$p_{e(m\ of\ n)} = p_{e1}^n.$$

The repetitions are only made when a decision, e.g. a change from the parking state to the driving state in the case of a tire pressure sensor, would be made due to an individual decision attempt. If this attempt already indicates that probably no decision will be made, repetitions can be abandoned and the energy consumption-intensive further measurements can be saved.

However, not all repetitions have to turn out the same for the decision to be made, but, according to the invention, a rate is defined and the value 'm' from n decision attempts has to be positive. Thereby, the value 'n' is, for example, the number of measurement values within the measurement interval and the value 'm' the predeterminable number of measurement values. The error probability then results as:

$$p_{e(m\ of\ n)} = p_{e1}^n / (1-p_{e1})^{m-n}.$$

This variation is particularly useful when the signal to be decided on is also random and can occasionally fall to a value which would not lead to a decision. For example, the decision whether a vehicle is driving or not can turn out wrong again and again due to short stopping interruptions although the vehicle has not been parked again, due to the tire pressure or due to a measurement of the centrifugal force with an acceleration sensor, even when the vehicle has already started driving. In this context, parking means a longer parking of the vehicle.

However, according to the invention, several thresholds can be defined, which have to occur with a different frequency to lead to a decision. For example, a first threshold has to occur ten times in a threefold standard deviation, a second threshold five times in a fourfold standard deviation, a third threshold two times in a fivefold standard deviation and the decision is only finally made when one of the criteria associated to the different switching thresholds is fulfilled within a defined time window.

According to the invention, however, different thresholds can be introduced, wherein points are associated to every threshold. Thereby, for example, a first threshold provides one point in a threefold standard deviation, a second threshold two points in a fourfold standard deviation, a third threshold four points in a fivefold standard deviation. The points are added up over a defined time window and the decision is only really made when a defined minimum number of points is obtained.

The time intervals of the repetition measurements do not have to be within the same period as the measurements prior to the threshold exceeding, but can be performed faster to ensure a sampling rate which is, on the one hand, still significantly below the bandwidth of the superposed noise but, on the other hand, possibly oversamples signals to be detected, e.g. driving-induced pressure changes, i.e. faster than the Nyquist rate defined by the Shannon sampling theory. If the repetition criterion is not fulfilled, a transition back to the old sampling rate defined for the parking state is made. When the repetition criterion is fulfilled, the increased sampling rate can be maintained or a transition to another sampling rate defined for the driving state can be made.

According to a further aspect, the inventive apparatus for determining the state parameter comprises a means for determining the predeterminable number. The means for determining the predeterminable number is preferably formed to determine the predeterminable number in dependence on a standard deviation of the measurement values, as has already been described.

The predeterminable number comprises, for example, a first predeterminable number and a second predeterminable number, wherein the means for determining from the predeterminable number is formed to determine the first predeterminable number in dependence on a first standard deviation of the measurement values, and to determine the second predeterminable number in dependence on a second standard deviation of the measurement values, wherein a first weighting point is associated to the first standard deviation, and wherein a second weighting point is associated to the second standard deviation, as has already been described. The inventive comparison means is formed to perform a plurality of comparisons, wherein the first or the second weighting point is associated to every comparison, and to generate the first comparison signal or the second comparison signal based on the sum of the weighting points, as has already been mentioned. Preferably, the first comparison parameter indicates the non-operated state of the vehicle, while the second comparison parameter indicates the driving state of the vehicle. This applies to the case where the state parameter is a driving situation of the vehicle comprising the non-operated state and the driving state.

Figure 2:
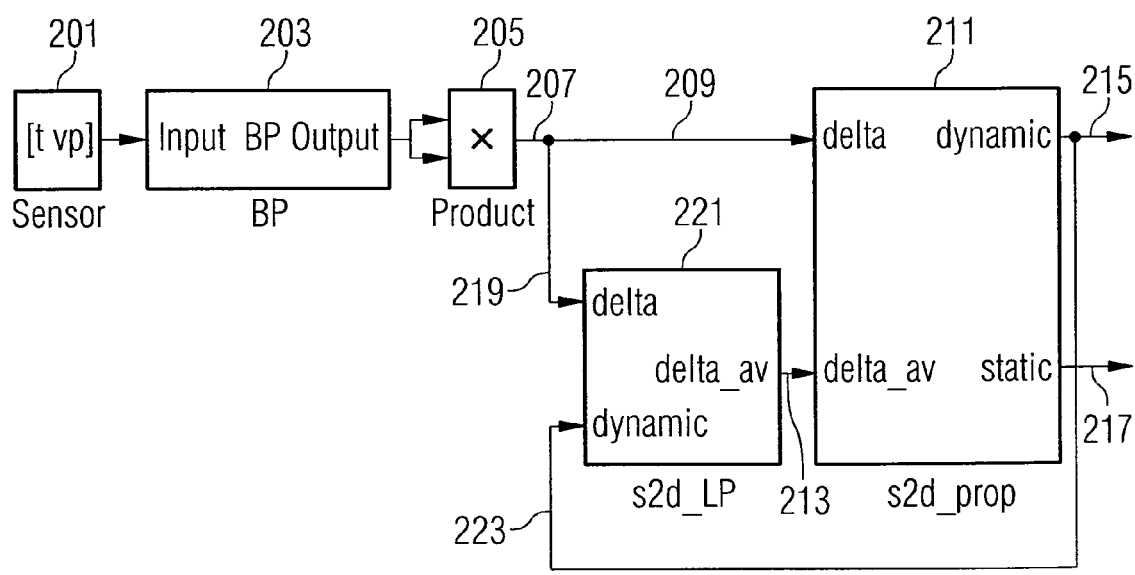
FIG. 2 is a basic circuit diagram of an inventive apparatus for determining a state parameter according to a further embodiment.

In FIG. 2, a circuit diagram of an inventive apparatus for determining a state parameter of an object to be monitored according to a further embodiment is illustrated.

The apparatus comprises a sensor 201 coupled to a band-pass filter 203. An output signal of the band-pass filter 203 is branched, wherein both portions are supplied to a multiplier 205. The multiplier 205 has an output 207, which is coupled to a first input 209 of a processing means 211, which can be a processor. Further, the processing means 211 comprises a second input 213, a first output 215 as well as a second output 217.

Further, the output 207 of the multiplier 205 is coupled to a first input 219 of a low-pass filter 221. Further, the low-pass filter has a second input 223 coupled to the first output 215 of the processing means 211.

The pressure sensor 201 (sensor) is formed to acquire tire pressure measurement data and to supply the tire pressure measurement value to the band-pass filter 203. Then, the pressure signal (tire pressure measurement value) is band-pass filtered to filter out the frequency range in which changes of the tire pressure caused by the driving operation are expected, as much as possible from the higher-frequency noise and the lower-frequency pressure changes caused by the ambient temperature. The output signal of the band-pass filter is then squared with the aid of the multiplier 205. The squared output signal of the band-pass represents a measure for a current size of the pressure changes in the relevant frequency range and will be referred to as short-term variance measure below. The squared signal is again low-pass filtered in the parking state (static) to obtain a long-term average value of the short-term variance measure. In the following, this value is referred to as long-term variance measure.

In the driving state (dynamic), the low-pass filtering is interrupted and the long-term variance measure remains constant on the last value prior to the change to the value determined in the parking operation or one of the immediately subsequent values.

Thereby, the processing means 211 takes on the task to make a decision about a transition from parking operation to driving operation and vice versa. Thereby, the processing means 211 has, for example, a configuration as basically illustrated in FIG. 3.

Figure 3:
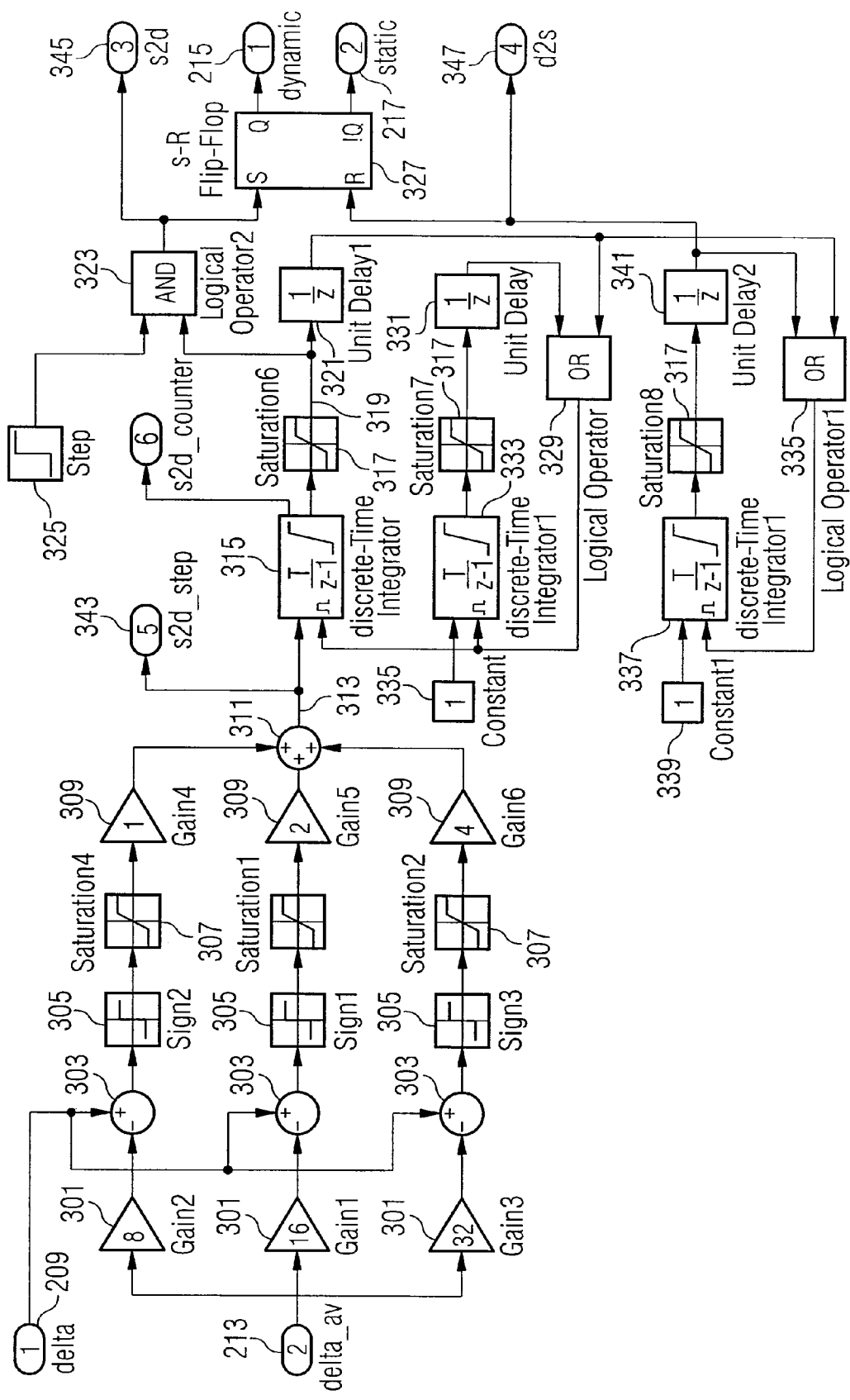
FIG. 3 is a basic circuit diagram of an apparatus for determining a state parameter according to a further embodiment.

A possible realization of the processing means 211 illustrated in FIG. 2 is shown in FIG. 3. First, the processing means comprises three amplifiers 301, the inputs of which are coupled to the second input 213. The outputs of the amplifiers 301 are each connected to the first input of a respective subtracter 303. The first input 209, however, is coupled to the respective second input of the respective subtracter 303. Each of the subtracters 303 has an output which is coupled to a sign decision means 305 as well as a restrictor 307 with an amplifier 309. Each of the amplifiers 309 has an output, wherein the outputs of the amplifiers 309 are provided to a summator 311. The summator 311 has an output 313 coupled to a first input of an integrator 315. The integrator has two outputs, wherein the first output of the integrator is coupled to a restrictor 317. The restrictor 317 has an output 319 coupled to a delay member 321. Further, the output 319 is coupled an AND operation block 323. The AND operation block 323 has a further input, which is coupled to an output of a step counter 325. Further, the AND operation block 323 has an output coupled to an S input of an S-R flip-flop 327. The flip-flop 327 has two outputs, which are coupled to the outputs 215 and 217 of the processing means 211.

An output of the delay member 321 is coupled to an OR operation block 329. An output of the OR operation block 329 is connected to the second input of the integrator 315. Further, the OR operation block 329 has a further input coupled to an output of a delay member 331. The delay member 331 has an input coupled to an output of a restrictor 317. The restrictor 317 comprises an input coupled to an output of an integrator 333. A first input of the integrator 333 is connected to a block 335 for providing a constant. A second input of the integrator 333 is connected to the second input of the integrator 315 and to the output of the OR operation block 329.

The output of the delay member 321 is coupled to an input of an OR operation member 335. The OR operation member 335 has an output coupled to a second input of an integrator 337. A first input of the integrator 337 is coupled to a block 339 for providing a constant value. The integrator 337 has an output coupled to the input of a restrictor 317. The restrictor 317 has an output coupled to an output of a delay member 341. The delay member 341 has an output coupled to a second output of the OR operation member 335. Further, the output of the delay member 341 is connected to an R input of the flip-flop 327.

Further, a signal tap area 343 is illustrated in FIG. 3, via which a signal applied to the output of the summator 311 can be tapped. Additionally, a tap area 345 is illustrated in FIG. 3, via which an output signal of the AND operation block 323 can be tapped. Further, FIG. 3 shows a tap area 347, via which an output signal of the delay member 341 can be tapped.

The processing means illustrated in FIG. 3 is formed to perform a decision about a transition from the parking operation to the driving operation preferably according to the method discussed below.

When the short-term variance measure (delta) exceeds a defined multiple of the long-term variance measure (delta_AV), one counter is incremented. As a variation illustrated in FIG. 3, several multiples (e.g. eightfold, sixteenfold and thirty-twofold) can be defined, and, at a higher multiple, the counter is incremented immediately by several steps, such as 1, 2 and 4. When the counter, which is realized by the integrator 315, reaches or exceeds a threshold within a defined time window generated by the integrator 333, a signal is generated, which can be tapped via the tapping area 345. If the threshold (comparison parameter) is not reached when the time window ends, the counter is reset. When the above-mentioned signals occurs in the parking state, a transition to the driving state is made, which is performed by the flip-flop 327. When the above signal does not occur at least once in the driving state within a further time window defined by the integrator 337, a transition back to the parking state is made, which can be controlled via the signal applied to the tapping area 347.

Exemplary simulation examples of the average tire pressure are illustrated in FIGS. 4a-e, which illustrate a derivation of the states driving or non-operation by the method described below.

Pressure measurement values are illustrated in FIG. 4a, wherein the pressure has been measured exemplarily in an 0.5 second interval. Starting from the pressure measurement values, a short-term average value is calculated, which is illustrated in FIG. 4b. For calculating the short-term average value, a first-order IIR filter has been used, which has the following transmission function:

$$H_{IIR1}(z) = \left(\frac{1-a}{1-a \cdot z^{-1}}\right).$$

Here, the term 'a' indicates a constant determining the cutoff frequency of the filter.

In FIG. 4c, a difference of the pressure values to the short-term average value of the pressure measurement is shown. This has been generated by a high-pass filtering $$(H_{HP}=1-H_{IIR1}(z)).$$

In order to reduce the noise influence, a band-pass filter can be used instead, which attenuates again the highest present portions of the signal above the frequency generated by the driving motions of the vehicle. Further, the differences are squared, which results in a short-term variance measure illustrated in FIG. 4d by the reference number (401).

The difference squares are again filtered with an IIR filter, which has the following transmission function:

$$H_{IIR2}(z) = \left(\frac{1-b}{1-b \cdot z^{-1}}\right),$$

wherein 'b' indicates a constant determining the cutoff frequency of the filter.

In the considered embodiment, the vehicle is first parked and begins to drive after 600 seconds. This leads to a change of state (curve 402) after the above-mentioned signal illustrated in FIG. 4e has been generated in the above-described method. The long-term variance measure is acquired starting from the transition to the driving state. The vehicle drives for about two hours and is parked again after about 7500 seconds, which can be seen in FIG. 4e (curve 403). After a defined time window has passed, within which no signal has occurred, a further signal d2s is generated, which causes a transition back to the parking state (curve 405).

Alternatively, the value via the input signal to the squaring means generating the short-term variance measure, can also be generated by a more complex band-pass, which has, for example, the following transmission function:

$$Hbp3_z(z) := \left[1 - \left[\frac{\frac{1}{16}}{1 - z \cdot \left(1 - \frac{1}{16}\right)}\right]\right] \cdot \left[\sum_{v=0}^{N-1} (b_v \cdot z^{-v})\right] \cdot \frac{1}{6}$$

with $$b := \begin{pmatrix} 1 \\ 2 \\ 2 \\ 1 \end{pmatrix}$$

From the above discussion it becomes clear that further, according to the invention, a time interval for transmitting the measurement values of the tire pressure sensor is determined such that the tire pressure sensor system can be operated by one battery over its whole life-span. Thereby, no measurement with an acceleration sensor is required to determine when non-operated periods occur, where the transmission rate can be reduced significantly in order to save energy.

The inventive system shows a behavior comparable to already existing solutions with acceleration sensors, so that it can replace the same. In contrary to the known methods, the adaptivity is improved by adapting only when low static variations of the tire pressure occur, such as in a parked vehicle. This provides the advantage that the behavior is only influenced by the noise of the pressure sensor system and by changes of the temperature, since tires can be seen approximately as isochore systems. The influences of temperature are so slow that they can be separated from the noise by simple filtering and thus they represent no real interference. The noise is mainly dependent on typical circuit properties, e.g. overall capacity of a capacitive pressure sensor, resistance of a resistive pressure measurement bridge, input noise and quantizing noise of an analog/digital converter, and can thus be predicted easily.

According to the invention, it is avoided by simple comparisons that the adaption, which is to substantially eliminate the temperature dependence and production deviation of the system parameters, drifts off to implausible ranges due to unfavorable conditions in the driving operation. Further, in the inventive concept, less parameters are required and the hardware and software effort is reduced, whereby both the system cost and the current consumption determining the life-span in battery-operated systems can be reduced.

FIG. 5 shows a block diagram of an inventive apparatus for determining a state parameter for the case that the state parameter is a driving situation of a vehicle determined based on tire pressure measurement values.

The apparatus indicated in FIG. 5 comprises a pressure sensor 501 coupled to an evaluation means 503. The evaluation means 503 comprises an output 505 to which a comparison means 507 as well as a means 509 for determining a comparison parameter are coupled. The comparison means 507 has a further input 511 as well as an output 513. The means 509 for determining the comparison parameter has an output, which is coupled to a means 514 for providing the comparison parameter. The means 514 for providing the comparison parameter has an output, which is coupled to the further input 511 of the comparison means.

The pressure sensor 501 is formed to measure the tire pressure and to transmit the tire pressure measurement values to the evaluation means 103. The evaluation means 503 is formed to evaluate a plurality of tire pressure measurement values provided by the pressure sensor 501 to output evaluated measurement values as the measurement values via the output 505. The evaluation means 503 corresponds to the already described evaluation means for evaluating the plurality of measurement values.

The means 509 for determining the comparison parameter is formed to receive the measurement values to determine therefrom the comparison parameter and to provide the comparison parameter (the predeterminable comparison parameter) to the means 514 for providing the comparison parameter. The means 514 for providing the comparison parameter is formed to provide the comparison parameter to the comparison means 507.

The comparison means 507 is formed to compare the measurement values with the comparison parameter to determine the driving situation. Thereby, the comparison parameter is used, as has already been mentioned, in successive determinations of the driving situation, e.g. during the driving state of the vehicle. According to the invention, the comparison parameter, which is provided by the means 114 for providing the comparison parameter 107, is maintained for a number of comparison processes after the driving state has been determined. Thereby, the comparison means 507 can, for example, store the previously determined comparison parameter so that the same can be used until the next indicated non-operated state.

The means 514 for providing the comparison parameter can, for example, comprise a memory where the comparison parameter determined in the parking state is stored and can be used and provided, respectively, for the comparison in the driving state. Additionally, the means 514 for providing the comparison parameter can, for example, be an interface or a connection between the means 509 for determining the comparison parameter and the comparison means 507 to apply the determined comparison parameter to the input of the comparison means 507. In that case, the means for determining the comparison parameter can determine the same both in the parking state and in the driving state.

The means 514 for providing the comparison parameter can further be formed to maintain the comparison parameter on its current value when a change of the determined driving situation between the non-operated state and the driving state occurs.

Further, it should become clear that the means 514 for providing can be formed separately and can be associated to the comparison means 507 and the means 509 for determining, respectively.

The comparison means 507 is formed to determine the driving situation based on the comparison between the measurement values provided by the evaluation means 503 and the comparison parameter. Preferably, the comparison means 507 is formed to output the first comparison signal or the second comparison signal, which indicates the driving situation (state parameter), for example the non-operated state or the driving state.

The comparison means 507 is formed to output, for example, the first comparison signal, which indicates the non-operated state of the vehicle when the predeterminable number, for example 2, of the measurement values falls below the comparison parameter and does not exceed the same, respectively.

Analogously, the comparison means 507 is formed to output the second comparison signal, which indicates the driving state of the vehicle when the predeterminable number, such as 2 or more, of measurement values exceeds the comparison parameter or does not fall below the same. Thereby, the fact is utilized that the measurement values exceed the average value of the measurement values determined in the parking state due to the higher dynamic in the driving state compared to the parking state.

However, according to the invention, for example, a grading of the states can also be detected. If, for example, the driving state has a first driving state with a first dynamic and a second driving state with a second dynamic, the comparison means 507 according to a further embodiment is formed to output the first comparison signal indicating the first driving state when a number of measurement values exceeds the first multiple of the comparison parameter but does not exceed or fall below a second multiple. Analogously, the second comparison signal indicates that the second driving state is predominant when the number (for example 2 or 3) of the measurement values exceeds the second multiple, for example fivefold, of the comparison parameter. This grading applies particularly when the second dynamic is larger than the first dynamic, i.e. when the second driving state is, for example, characterized by a higher speed than the first driving state.

FIG. 6 illustrates a derivation of the states "driving or non-operated", wherein for the derivation of the states the method described below is used exemplarily. The samples 601 illustrate the squared high-pass or band-pass filtered pressure values. It is typical of these values that they are lower in the parked vehicle than in the driving vehicle, because pressure variations due to the different load of individual tires are added to the noise of the measurement values during driving. At the beginning of the shown measurement, the vehicle was parked and it can be seen that only a few samples exceed the drawn threshold due to the noise of the individual measurement values, wherein these samples are indicated by 'a'. If this occurs, the measurement is repeated. Since the vehicle is still parked, the measurement variations only occur due to the mainly thermal noise, which is caused by the sensor and the measurement circuit and thus they contain high power density portions in high frequencies. In the samples indicated by 'a', it will be determined with high probability in the repetition that the value of the repetitions measurement lies below the value of the threshold. Due to the fact that the threshold exceeding will not be repeated with high probability, it can be assumed that it has occurred due to measurement noise. As has been described above, a certain number of repetitions of criteria fulfillment within a window of a predetermined number of measurement values is predetermined (n of m) in order to trigger a state change. In a random exceeding of the switching threshold due to noise, this will not occur with high probability. As a result of this, no further action will be initiated. When reaching the point indicated with 'b', the vehicle starts driving. The threshold is again exceeded. Then, the measurement is repeated again. The pressure variations due to which this exceeding has occurred are band-limited. This means that exceeding the threshold can be reproduced in consecutive measurements with high probability and, therefore, the criterion for multiple exceeding within the time window for the predetermined number of measurement values will be fulfilled. This leads to a transition to the driving state.

Figure 7C:
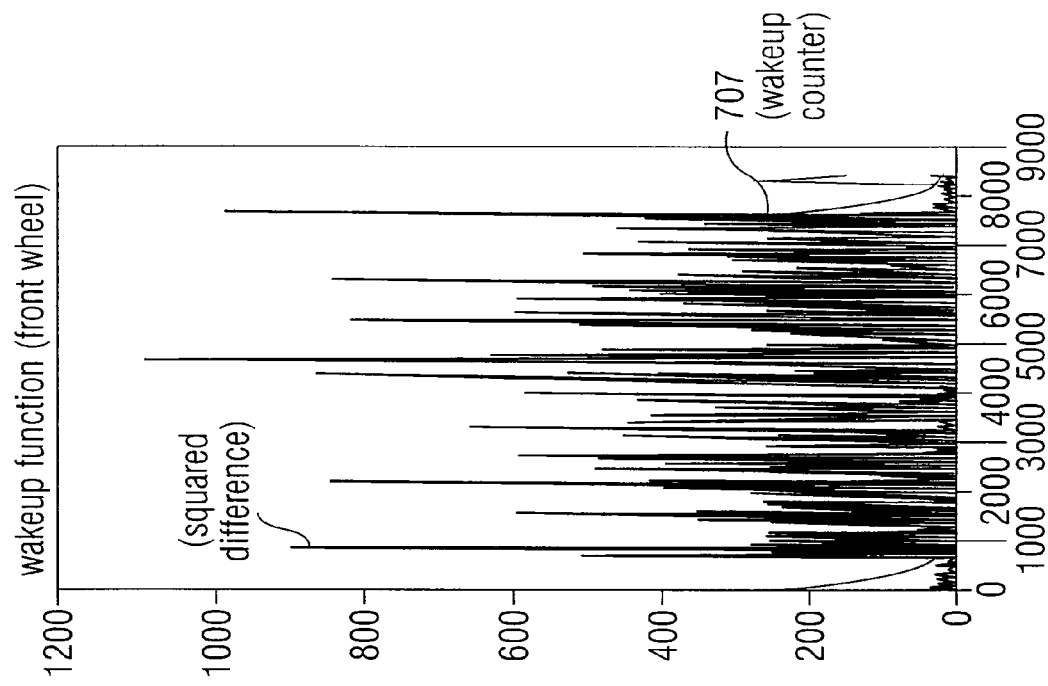
FIG. 7a-c are exemplary representations of determined pressure measurement curves for determining a driving state.
Figure 7A:
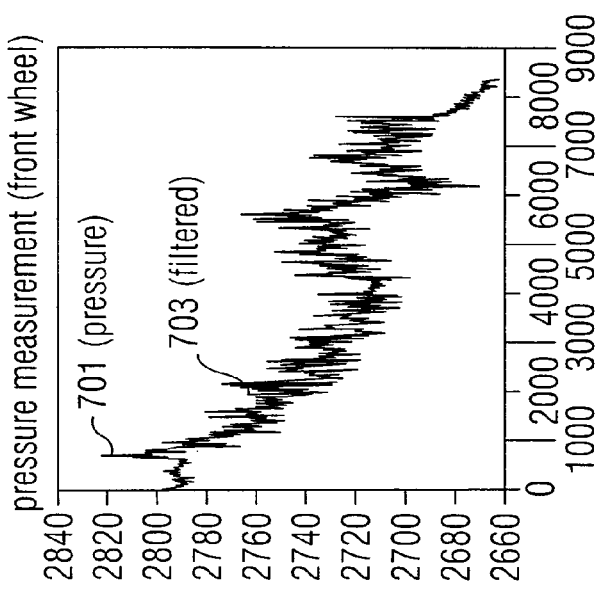
Figure 7B:
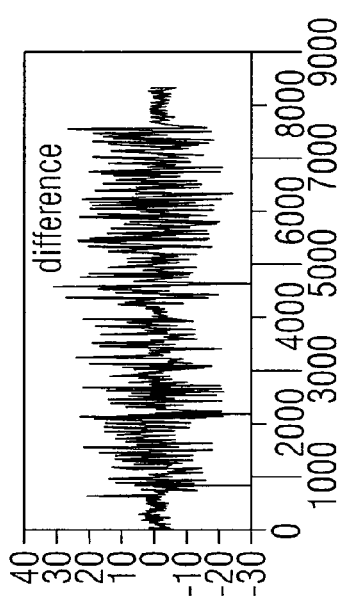

FIGS. 7a-c show exemplary representations of determined pressure measurement curves for determining a driving state based on further embodiments.

The exemplary diagrams illustrated in FIGS. 7a-c are based on pressure measurements in a tire during a driving test. The test begins and ends with 600 seconds parking each and contains in between two hours driving time in city traffic. In FIG. 7a, the pressure curve 701 and its average value 703 obtained by low-pass filtering are illustrated.

In FIG. 7b, the pressure curve values are high-pass filtered (in this case by a difference formation of measurement value and average value). For this, other high-pass or band-pass filters can be used. The values illustrated in FIG. 7c correspond to the squares of the differences shown in FIG. 7b. The curve 707 shown in FIG. 7c illustrates a falling threshold and in the illustrated case the pulse response of an IIR filter. When the curve 707 intersects the curve 705, a pressure measurement value is transmitted. It can be seen that during parking times (here 600 seconds at the beginning and the end) this can only be done at very large time intervals.

As a variation, the measurement can be performed with lower resolution and can thus be performed with simpler and more current-saving circuits and methods.

Figure 8:
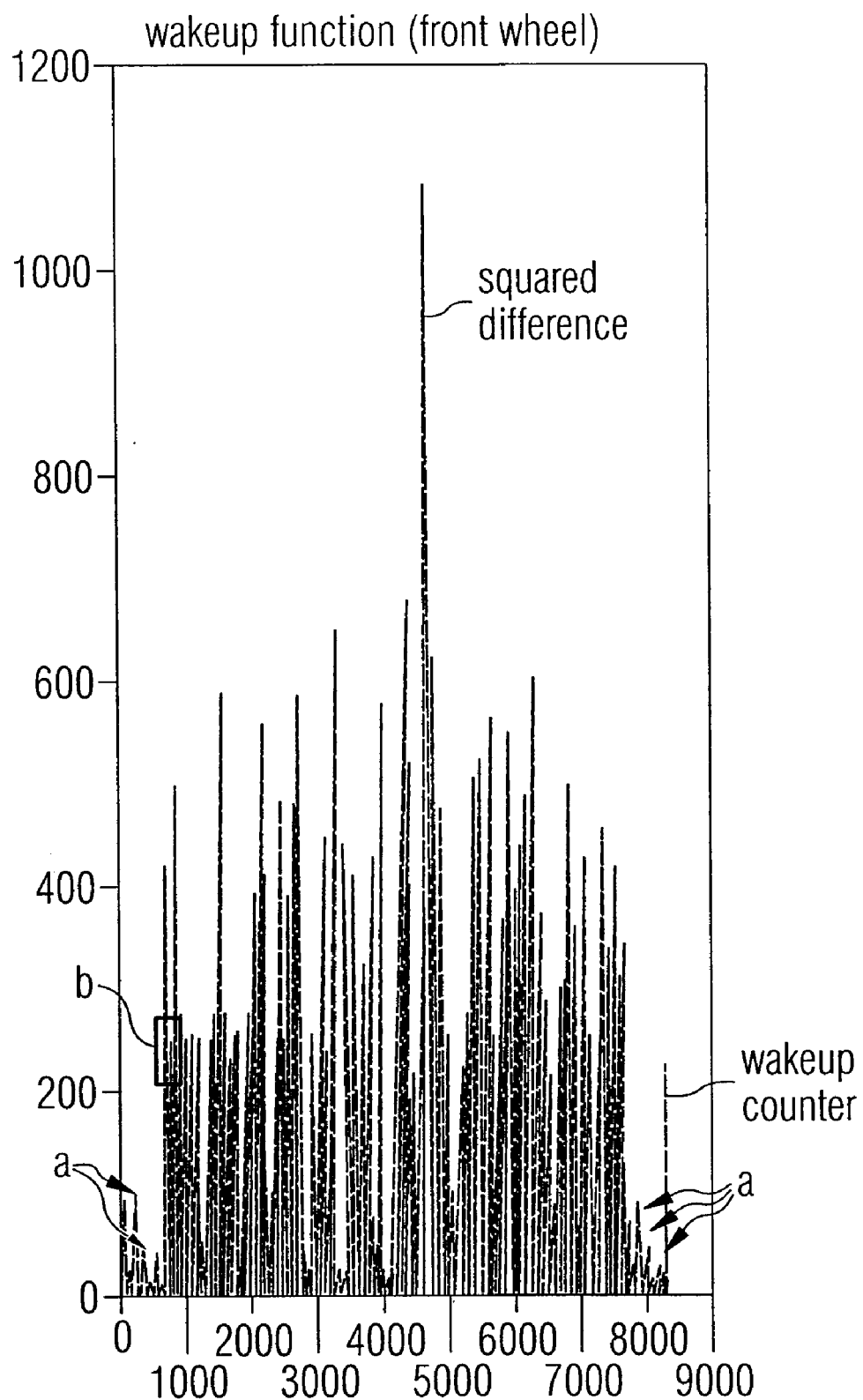
FIG. 8 is an exemplary representation of a determined pressure measurement curve for determining a driving state.

In FIG. 8, the results of an increase of noise of the measurement circuit or the pressure sensor are illustrated, which substantially have an effect on the signal voltages while the vehicle is parked, since the overlaying pressure signals during driving are higher and drown out this noise. Therefore, premature exceedings of the dynamic threshold will be allowed due to increased noise. If this occurs, the decision is again verified by repetitions in the same way as has already been described. The positions indicated by 'a' mark threshold exceedings, which are not verified by repetitions since they occur due to high-frequency noise. The positions indicated by 'b' mark threshold exceedings which are verified by repetition because they are caused by pressure changes in the tire due to driving dynamic (e.g. load change during braking or driving in bends), which change only slowly compared to noise.

Further, the fact can be used that wrong decisions for making a decision can be given other error tolerances than for not making a decision. If, for example, a tire pressure sensor is to be switched from the parking state to the driving state, a wrong switching from the parking state to the driving state has much more serious effects, namely the increase of the measurement rate and the transmission rate and thus the current consumption of the battery-operated system than erroneously remaining in the parking state, which merely has the effect that starting the vehicle is detected only a short time later. Thus, the error tolerance for changing from the parking state to the driving state is much lower than the error tolerance for remaining in the parking state. This applies both for methods where the differentiation between driving state and parking state is made by measuring the centrifugal forces with an acceleration sensor and for a system where a curve of the tire pressure measurement values is used for this decision.

Here, as a further example, a method can be used, for example, where no difference is made between driving state and parking state, but where the decision when a measurement value is to be transmitted is derived directly from the curve of the tire pressure measurement values. Here, a wrong decision for transmitting causes again a transmission process with high current consumption placing a burden on the battery-operated system, while a wrong decision for not transmitting merely causes a short delay of the transmission process.

Further, it applies that the fulfillment of the criteria, which means switching between the driving state and the parking state or the decision to transmit a measurement value occurs extremely rarely compared to the time where no decisions are to be made, which means the continuous remaining in the driving state or the parking state or not transmitting measurement values.

The inventive method allows to perform the measurements with exactly the minimum frequency defined by the predetermined maximum allowable decision delay time, to decide safely whether a criterion is fulfilled and still to require less current.

In an appropriate choice of time intervals between the repetitions, the threshold exceeding can be reproduced with high probability. A repetition criterion set up according to the above-described rules can therefore be fulfilled with high probability. If this criterion is fulfilled, the associated action, e.g. recognizing a transition from parking state to driving state is performed with an associated increase of the measurement rate and increased RF transmission of measurement values.

Further, the inventive concept can be summarized as follows:
1. The pressure in the tires is measured at time intervals, which are shorter than the time period intended for detecting the transition between non-operated state and driving state.
2. A short-term average value of the pressure curve is formed from the successive pressure measurements by filtering.
3. The difference to the average value is formed from every measurement value.
4. The differences are squared.
5. The squares are filtered again to determine a short-term average value of the squared deviations.
6. A transition from a non-operated state to a driving state is performed when a predetermined number of exceedings of the current difference squares over a predetermined multiple of the short-term average value of the different squares occurs within a predetermined number of measurements.
7. In this transition, filtering of the difference squares is terminated and the last short-term average value of the difference squares is maintained.
8. A transition from the driving state to the non-operated state is performed when the switching condition from non-operated state to driving state is not fulfilled within a predetermined number of measurements.
9. After switching back to the non-operated state, filtering the difference squares for adapting the switching threshold is activated again.

Variations are:
(to 1) The measurement times can be different in the driving state than in the non-operated state. This becomes significantly easier in the new method, because the adaption of the switching thresholds is only performed in one of the two states.
(to 2,3) The pressure difference is obtained directly from two subsequent pressure measurements without forming a short-term average value.
(to 4) Instead of the difference squares, difference amounts can be used.
(to 5) The multiple of the short-term average value is limited by a maximum value to ensure than high pressure deviations, which are not plausible in the non-operated state, always lead to a transition to the driving state.
(to 5) The multiple of the short-term average value is limited by a minimum value to ensure that pressure deviations, which are clearly too low for a driving state, cannot lead to an unnecessary transition to the driving state.
(to 5,6) By grading the multiples and fractions, which are defined as switching borders, additional states can be defined. Example: non-operated state, driving (low dynamic), driving (high dynamic), alarm state.
(to 7) The frozen value of the short-term average value of the difference squares is adapted to the proportionality of the thermal noise (which should cause the main portion of the measurement differences in the non-operated state) to the absolute temperature by a temperature compensation. I.e., in a temperature increase, the switching threshold, which defines the transition from the non-operated state to the driving state, is also raised to make the switching condition independent of the temperature.

According to a further aspect, the inventive concept can be summarized as follows:
1. The system has a switching threshold, and when the same is exceeded or fallen below, an action is triggered, such as the transmission of measurement data towards the outside or the change of a system-internal state, which again, for example, causes an increase of the sampling rate.
2. This switching threshold can also be determined adaptively as described in (1,2) or can be altered by a timer in a time-dependent way.
3. The noise caused by the sensor system and its characteristic is known and, thus, an error probability ($p_{e1}$) for the single measurement results.
4. To make a decision with a predetermined maximum allowable error probability ($p_{emax}$), a repetition number is calculated which results from a rounded-off integer quotient of the logarithms of the two error probabilities.

$$n = \log(p_{e1})/\log(p_{emax})$$

5. The decision is always repeated when a decision criterion is fulfilled.
   If it is not the same in the repetition, the decision is discarded and the repetitions are terminated.
   If the decision is the same in the repetition, the repetition is continued until n repetitions with the same result are present and then the decision is finally made.
   The error probability for the n-fold decision is then:

$$p_{e(n\ of\ n)} = p_{e1}^n.$$

6. The repetitions are only performed when due to a single decision attempt a decision (example tire pressure sensor: transition from the parking state to the driving state) would be made, and this attempt already indicates that probably no decision would be made, the repetitions can be omitted and the energy consumption-intensive measurements can be saved.

Variations are:
(to 5) Not all repetitions have to be the same for the decision to be made, but a rate is defined that m of n decision attempts have to be positive.
  The error probability results as $p_{e(m\ of\ n)} = p_{e1}^n/(1-p_{e1})^{m-n}$.
  This variation is particularly useful when the signal to be decided upon is also random and can occasionally fall to a value, which would not lead to a decision (e.g.: the decision whether a vehicle drives or not due to the tire pressure or due to a measurement of the centrifugal forces with an acceleration sensor can be wrong time and again due to short stops even if the vehicle is already driving, although the vehicle has not been parked again (here, parking means longer parking)).

(to 5) Several thresholds can be defined, which have to occur with a different frequency in order to lead to a decision (e.g.:
1. threshold with 3fold standard deviation has to occur 10 times
2. threshold with 4fold standard deviation has to occur 5 times
3. threshold with 5fold standard deviation has to occur 2 times).
The decision is only finally made when one of the criteria associated to the different thresholds is fulfilled within a defined time window.

(to 5) As before, different thresholds can be introduced and points can be associated to every threshold (e.g.:
1. threshold with 3fold standard deviation provides 1 point
2. threshold with 4fold standard deviation provides 2 points
3. threshold with 5fold standard deviation provides 4 points).
The points are summed up via a defined time window and the decision is only really made when a defined minimum number of points is obtained.

(to 5) The time intervals of the repetition measurements have to be in the same period as the measurements prior to the threshold exceeding, but can take place faster to ensure a sampling rate, which is, on the one hand, significantly below the bandwidth of the superposed noise, but, on the other hand, oversamples the signal to be detected (e.g. driving-induced pressure changes) (faster than the Nyquist rate defined by the Shannon sampling theorem). When the repetition criterion is not fulfilled, a switch-back to the old sampling rate defined for the parking state is made. When the repetition criterion is fulfilled, the increased sampling rate can be maintained or a change to another sampling rate defined for the driving state can be made.

Depending on the circumstances, the inventive method can be implemented in hardware or in software. The implementation can be on a digital memory medium, particularly a disk or a CD with electronically readable control signals, which can cooperate with a programmable computer system such that the corresponding method is performed. Generally, the invention also consists in a computer program product with a program code for performing the inventive method stored on a machine-readable carrier, when the computer program product runs on a computer. In other words, the invention can be realized as a computer program with a program code for performing the method when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for determining a state parameter of an object to be monitored, comprising:
a provider for providing a plurality of measurement values, wherein the measurement values comprise information relating to the state parameter of the object to be monitored;
a comparator for comparing the measurement values with a predeterminable comparison parameter, wherein the comparator is formed to output a first comparison signal when a predeterminable number of measurement values within a measurement interval falls below the comparison parameter, or to output a second comparison signal when the predeterminable number of measurement values reaches or exceeds the comparison parameter, wherein the first comparison signal or the second comparison signal indicate the state parameter; and
a determiner for determining and providing the predeterminable comparison parameter, wherein the state parameter is a driving situation of a vehicle, and the driving situation comprises a non-operated state and a driving state, wherein the determiner is formed to maintain the predeterminable comparison parameter at its current value when the first or the second comparison signal indicate a change from the non-operated state to the driving state, and wherein the determiner is further formed to continue the determination of the predeterminable comparison parameter when the first of the second comparison signal indicate the change from the driving state to the non-operated state.

2. The apparatus according to claim 1 wherein, wherein the provider for providing the plurality of measurement values comprises a tire pressure sensor or an acceleration sensor.

3. The apparatus according to claim 1, wherein the provider for providing the measurement values comprises an evaluator for evaluating the plurality of measurement values to provide evaluated measurement values as measurement values.

4. The apparatus according to claim 3, wherein the evaluator comprises a determiner for determining an average value of the plurality of measurement values and a subtracter for determining a difference between the measurement values and the average value, wherein the evaluated measurement values are the difference or an absolute value of the difference.

5. The apparatus according to claim 4, wherein the determiner for determining the average value comprises a low-pass filter to determine the average value by low-pass filtering.

6. The apparatus according to claim 4, wherein the determiner for determining the predeterminable comparison parameter is formed to determine an average value of the measurement values, wherein the average value of the evaluated measurement values is the predeterminable comparison parameter.

7. The apparatus according to claim 6, wherein the determiner for determining the predeterminable comparison parameter has a low-pass filter to determine the average value of the measurement values by low-pass filtering.

8. The apparatus according to claim 3, wherein the evaluator comprises a subtracter for determining a difference between subsequent measurement values, wherein the evaluated measurement values are the difference or an absolute value of the difference.

9. The apparatus according to claim 3, wherein the evaluator has a squarer, which is formed to square the difference or an absolute value of the difference to obtain a squared difference, wherein the evaluated measurement values are the squared difference.

10. The apparatus according to claim 1, wherein the determiner for determining the comparison parameter is formed to output a multiple of an average value of the measurement values or a fraction of an average value of the measurement values as the predeterminable comparison parameter.

11. The apparatus according to claim 1, wherein the determiner for determining the predeterminable comparison parameter is controllable, and wherein the apparatus for determining the state parameter comprises a controller for controlling the determiner for determining the predeterminable comparison parameter, wherein the controller is formed to generate a first control signal, in response to which the determiner for determining the predeterminable comparison parameter determines the predeterminable comparison parameter, and to generate a second control signal, in response to which the determiner for determining the predeterminable comparison parameter interrupts a determination of the predeterminable comparison parameter.

12. The apparatus according to claim 11, wherein the controller is formed to output the first control signal when the first or the second comparison signal indicates the non-operated state and to output the second control signal when the first or second comparison signal indicates the driving state, wherein the controller is formed to derive the first control signal or the second control signal from the first comparison signal or the second comparison signal.

13. The apparatus according to claim 1, wherein the provider for providing the plurality of measurement values comprises a measurement sensor, wherein the measurement sensor is a tire pressure sensor or an acceleration sensor, wherein the state parameter is a driving situation of a vehicle, wherein the driving situation comprises a non-operated state and a driving state, wherein the measurement sensor has a first measurement rate in the non-operated state and a second measurement rate in the driving state, wherein the first measurement rate and the second measurement rate are different.

14. The apparatus according to claim 1, wherein the measurement interval comprises a number of measurement values.

15. The apparatus according to claim 14, wherein the number of measurement values is set.

16. The apparatus according to claim 15, further comprising a determiner for determining the number of measurement values.

17. The apparatus according to claim 16, wherein the determiner for determining the number of measurement values is formed to determine the number of measurement values by using a maximum allowable error probability, wherein the maximum allowable error probability indicates a maximum allowable probability of a wrong decision about the first or the second comparison signal from a plurality of comparisons.

18. The apparatus according to claim 16, wherein the determiner for determining the number of measurement values is formed to determine the number of measurement values from a ratio of logarithms of an error probability of a measurement value and the maximum allowable error probability.

19. The apparatus according to claim 1, further comprising a determiner for determining the predeterminable number.

20. The apparatus according to claim 19, wherein the determiner for determining the predeterminable number is formed to determine the predeterminable number in dependence on a standard deviation of the measurement values.

21. The apparatus according to claim 20, wherein the predeterminable number comprises a first predeterminable number and a second predeterminable number, wherein the determiner for determining the predeterminable number is formed to determine the first predeterminable number in dependence on a first standard deviation of the measurement values and to determine the second predeterminable number in dependence on a second standard deviation, wherein a first weighting point is associated to the first standard deviation and wherein a second weighting point is associated to the second standard deviation, wherein the comparator is formed to perform a plurality of comparisons, wherein the first or second weighting point is associated to every comparison, and to generate the first or the second comparison signal based on a sum of the weighting points.

22. The apparatus according to claim 1, wherein the first or second comparison signal indicates the non-operated state and wherein the other of the first or second comparison signal indicates the driving state.

23. The apparatus according to claim 22, which is formed to change from the non-operated state to the driving state when a predetermined number of exceedings of a current difference square over a predetermined multiple of a short-term average value of the difference squares occurs within a predetermined number of measurements.

24. The apparatus according to claim 23, which is formed such that the multiple of the short-term average value is limited by a maximum value, to ensure that high pressure deviations in the non-operated state always lead to a transition to the driving state.

25. The apparatus according to claim 23, which is formed such that the multiple of the short-term average value is limited by a minimum value to ensure that low pressure deviations in the non-operated state do not lead to a transition to the driving state.

26. The apparatus according to claim 22, which is formed to change from a driving state to a non-operated state when a switching condition from the non-operated state to the driving state is not fulfilled within a predetermined number of measurements.

27. The apparatus according to claim 22, which is formed such that a maintained value of a short-term average value of the difference squares is adapted to the proportionality of thermal noise to the absolute temperature when the noise causes the main portion of the measurement differences in the non-operated state, so that in a temperature increase the switching threshold, which defines the transition from the non-operated state to the driving state is raised in order to make the switching condition independent of the temperature.

28. The apparatus according to claim 1, which is formed to repeat a decision with respect to a change between the non-operated state and the driving state when a decision criterion is fulfilled, to discard the decision and to terminate the repetitions when the decision is not the same in the repetition, and for the case that the decision is the same in the repetition, to continue the repetition until n repetitions with the same results are present and to make a decision based on the n repetitions, wherein the error probability for the n-fold decision is $p_{e(n\ of\ n)} = p_{e1}^n$, wherein n is the number of repetitions and pe1 the error probability of a value.

29. The apparatus according to claim 28, which is formed to perform the repetitions only when due to a single decision attempt a decision has been made.

30. The apparatus according to claim 28, wherein the decision is a transition from the non-operated state to the driving state.

31. The apparatus according to claim 28, which is formed to make a decision when m of n decision attempts have to be positive, wherein the error probability is $p_{e(m\ of\ n)} = p_{e1}^n / (1-p_{e1})^{m-n}$, wherein pe1 is the error probability of a value.

32. The apparatus according to claim 28, wherein several thresholds are defined, wherein the apparatus is formed to make a decision when the thresholds have occurred with a different frequency.

33. The apparatus according to claim 32, wherein a first threshold has to occur 10 times in a 3-fold standard deviation, and wherein a second threshold has to occur 5 times in a 4-fold standard deviation, and wherein a third threshold has to occur twice in a 5-fold standard deviation to make a decision, wherein the apparatus is formed to make the decision when one of the criteria associated to the different thresholds is fulfilled within a defined time window.

34. The apparatus according to claim 33, wherein points are associated to every threshold.

35. The apparatus according to claim 34, wherein a first threshold provides a point in 3-fold standard deviation, wherein a second threshold provides two points in 4-fold standard deviation, wherein a third threshold provides four points in 5-fold standard deviation, wherein the apparatus is formed to sum the points over a defined time window and to make the decision when a defined minimum number of points is achieved.

36. The apparatus according to claim 28, which is formed to perform the repetition measurements in a time period that differs from the time period of the measurements prior to the threshold exceeding and to perform the repetition measurements faster in order to ensure a sampling rate, which lies below a bandwidth of a superposed noise, wherein the signal to be detected, which indicates pressure changes caused by driving, is oversampled, wherein a sampling rate is larger than the Nyquist rate, and wherein the apparatus is formed to switch back to the old sampling rate defined for the non-operated state when the repetition criterion is not fulfilled, and to maintain the increased sampling rate or to change to another sampling rate defined for the driving state when the repetition criterion is fulfilled.

37. A method for determining a state parameter of an object to be monitored, comprising the steps of:
   providing a plurality of measurement values, wherein the measurement values comprise information relating to the state parameter of the object to be monitored;
   comparing the measurement values to a predeterminable comparison parameter to generate and output a first comparison signal when a predeterminable number of measurement values within a measurement interval falls below the comparison parameter or to generate and output a second comparison signal when the predeterminable number of measurement values within the measurement interval reaches or exceeds the comparison parameter, wherein the first comparison signal or the second comparison signal indicate the state parameter,
   determining and providing the predeterminable comparison parameter, wherein the state parameter is a driving situation of a vehicle, and the driving situation comprises a non-operated state and a driving state;
   maintaining the predeterminable comparison parameter at its current value when the first or the second comparison signal indicate a change from the non-operated state to the driving state; and
   continuing the determination of the predeterminable comparison parameter when the first or the second comparison signal indicate the change from the driving state to the non-operated state.

38. A computer program with a program code for performing a method for determining a state parameter of an object to be monitored, comprising the steps of:
   providing a plurality of measurement values, wherein the measurement values comprise information relating to the state parameter of the object to be monitored;
   comparing the measurement values to a predeterminable comparison parameter to generate and output a first comparison signal when a predeterminable number of measurement values within a measurement interval falls below the comparison parameter or to generate and output a second comparison signal when the predeterminable number of measurement values within the measurement interval reaches or exceeds the comparison parameter, wherein the first comparison signal or the second comparison signal indicate the state parameter
   determining and providing the predeterminable comparison parameter, wherein the state parameter is a driving situation of a vehicle, and the driving situation comprises a non-operated state and a driving state;
   maintaining the predeterminable comparison parameter at its current value when the first or the second comparison signal indicate a change from the non-operated state to the driving state; and
   continuing the determination of the predeterminable comparison parameter when the first or the second comparison signal indicate the change from the driving state to the non-operated state,
   when the computer program runs on a computer.

39. An apparatus for determining a state parameter of an object to be monitored, comprising:
   a provider for providing a plurality of measurement values, wherein the measurement values comprise information relating to the state parameter of the object to be monitored;
   a comparator for comparing the measurement values with a predeterminable comparison parameter, wherein the comparator is formed to output a first comparison signal when a predeterminable number of measurement values within a measurement interval falls below the comparison parameter, or to output a second comparison signal when the predeterminable number of measurement values reaches or exceeds the comparison parameter, wherein the first comparison signal or the second comparison signal indicate the state parameter; and
   a determiner for determining and providing the predeterminable comparison parameter, wherein the determiner for determining the predeterminable comparison parameter is controllable, and wherein the apparatus for determining the state parameter comprises a controller for controlling the determiner for determining the predeterminable comparison parameter, wherein the controller is formed to generate a first control signal, in response to which the determiner for determining the predeterminable comparison parameter determines the predeterminable comparison parameter, and to generate a second control signal, in response to which the determiner for determining the predeterminable comparison parameter interrupts a determination of the predeterminable comparison parameters;
   wherein the state parameter is a driving situation of a vehicle, wherein the driving situation comprises a non-operated state and a driving state, wherein the controller is formed to output the first control signal when the first or the second comparison signal indicates the non-operated state and to output the second control signal when the first or second comparison signal indicates the driving state, wherein the controller is formed to derive the first control signal or the second control signal from the first comparison signal or the second comparison signal.

40. An apparatus for determining a state parameter of an object to be monitored, comprising:
- a provider for providing a plurality of measurement values, wherein the measurement values comprise information relating to the state parameter of the object to be monitored;
- a comparator for comparing the measurement values with a predeterminable comparison parameter, wherein the comparator is formed to output a first comparison signal when a predeterminable number of measurement values within a measurement interval falls below the comparison parameter, or to output a second comparison signal when the predeterminable number of measurement values reaches or exceeds the comparison parameter, wherein the first comparison signal or the second comparison signal indicate the state parameter; and
- a determiner for determining the number of measurement values, wherein the determiner for determining the number of measurement values is formed to determine the number of measurement values by using a maximum allowable error probability, wherein the maximum allowable error probability indicates a maximum allowable probability of a wrong decision about the first or the second comparison signal from a plurality of comparisons.

41. An apparatus for determining a state parameter of an object to be monitored, comprising:
- a provider for providing a plurality of measurement values, wherein the measurement values comprise information relating to the state parameter of the object to be monitored;
- a comparator for comparing the measurement values with a predeterminable comparison parameter, wherein the comparator is formed to output a first comparison signal when a predeterminable number of measurement values within a measurement interval falls below the comparison parameter, or to output a second comparison signal when the predeterminable number of measurement values within the measurement interval reaches or exceeds the comparison parameter, wherein the first comparison signal or the second comparison signal indicate the state parameter,
- wherein the state parameter indicates a driving situation of a vehicle, wherein the driving situation comprises a non-operated state and a driving state, wherein the first or second comparison signal indicates the non-operated state and wherein the other of the first or second comparison signal indicates the driving state,
- wherein the apparatus is formed to change from a driving state to a non-operated state when a switching condition from the non-operated state to the driving state is not fulfilled within a predetermined number of measurements.

42. An apparatus for determining a state parameter of an object to be monitored, comprising:
- a provider for providing a plurality of measurement values, wherein the measurement values comprise information relating to the state parameter of the object to be monitored; and
- a comparator for comparing the measurement values with a predeterminable comparison parameter, wherein the comparator is formed to output a first comparison signal when a predeterminable number of measurement values within a measurement interval falls below the comparison parameter, or to output a second comparison signal when the predeterminable number of measurement values reaches or exceeds the comparison parameter, wherein the first comparison signal or the second comparison signal indicate the state parameter, wherein the state parameter indicates a driving situation of a vehicle, wherein the driving situation comprises a non-operated state and a driving state, wherein the first or second comparison signal indicates the non-operated state and wherein the other of the first or second comparison signal indicates the driving state, and wherein the comparator is formed to repeat a decision with respect to a change between the non-operated state and the driving state when a decision criterion is fulfilled, to discard the decision and to terminate the repetitions when the decision is not the same in the repetition, and for the case that the decision is the same in the repetition, to continue the repetition until n repetitions with the same results are present and to make a decision based on the n repetitions, wherein the error probability for the n-fold decision is $p_{e(n\ of\ n)} = p_{e1}{}^n$, wherein n is the number of repetitions and $p_{e1}$ the error probability of a value.

43. The apparatus according to claim 42, which is formed to perform the repetitions only when due to a single decision attempt a decision has been made.

44. The apparatus according to claim 42, wherein the decision is a transition from the non-operated state to the driving state.

45. The apparatus according to claim 42, which is formed to make a decision when m of n decision attempts have to be positive, wherein the error probability $p_{e(m\ of\ n)} = p_{e1}{}^n/(1-p_{e1})^{m-n}$, wherein $P_{e1}$ is the error probability of a value.

46. The apparatus according to claim 42, wherein several thresholds are defined, wherein the apparatus is formed to make a decision when the thresholds have occurred with a different frequency.

47. The apparatus according to claim 46, wherein a first threshold has to occur 10 times in a 3-fold standard deviation, and wherein a second threshold has to occur 5 times in a 4-fold standard deviation, and wherein a third threshold has to occur twice in a 5-fold standard deviation to make a decision, wherein the apparatus is formed to make the decision when one of the criteria associated to the different thresholds is fulfilled within a defined time window.

48. The apparatus according to claim 47, wherein points are associated to every threshold.

49. The apparatus according to claim 48, wherein a first threshold provides a point in 3-fold standard deviation, wherein a second threshold provides two points in 4-fold standard deviation, wherein a third threshold provides four points in 5-fold standard deviation, wherein the apparatus is formed to sum the points over a defined time window and to make the decision when a defined minimum number of points is achieved.

50. The apparatus according to claim 42, which is formed to perform the repetition measurements in a time period that differs from the time period of the measurements prior to the threshold exceeding and to perform the repetition measurements faster in order to ensure a sampling rate, which lies below a bandwidth of a superposed noise, wherein the signal to be detected, which indicates pressure changes caused by driving, is oversampled, wherein a sampling rate is larger than the Nyquist rate, and wherein the apparatus is formed to switch back to the old sampling rate defined for the non-operated state when the repetition criterion is not fulfilled, and to maintain the increased sampling rate or to change to another sampling rate defined for the driving state when the repetition criterion is fulfilled.

51. An apparatus for determining a state parameter of an object to be monitored, comprising:
  a provider for providing a plurality of measurement values, wherein the measurement values comprise information relating to the state parameter of the object to be monitored;
  a comparator for comparing the measurement values with a predeterminable comparison parameter, wherein the comparator is formed to output a first comparison signal when a predeterminable number of measurement values within a measurement interval falls below the comparison parameter, or to output a second comparison signal when the predeterminable number of measurement values within the measurement interval reaches or exceeds the comparison parameter, wherein the first comparison signal or the second comparison signal indicate the state parameter;
  wherein the provider for providing the measurement values comprises an evaluator for evaluating the plurality of measurement values to provide evaluated measurement values as measurement values, wherein the evaluator comprises a subtracter for determining a difference between subsequent measurement values, wherein the evaluated measurement values are the difference or an absolute value of the difference.

52. An apparatus for determining a state parameter of an object to be monitored, comprising:
  a provider for providing a plurality of measurement values, wherein the measurement values comprise information relating to the state parameter of the object to be monitored; and
  a comparator for comparing the measurement values with a predeterminable comparison parameter, wherein the comparator is formed to output a first comparison signal when a predeterminable number of measurement values within a measurement interval falls below the comparison parameter, or to output a second comparison signal when the predeterminable number of measurement values within the measurement interval reaches or exceeds the comparison parameter, wherein the first comparison signal or the second comparison signal indicate the state parameter;
  wherein the provider for providing the measurement values comprises an evaluator for evaluating the plurality of measurement values to provide evaluated measurement values as measurement values, wherein the evaluator has a squarer, which is formed to square the difference or an absolute value of the difference to obtain a squared difference, wherein the evaluated measurement values are the squared difference.

53. An apparatus for determining a state parameter of an object to be monitored, comprising:
  a provider for providing a plurality of measurement values, wherein the measurement values comprise information relating to the state parameter of the object to be monitored;
  a comparator for comparing the measurement values with a predeterminable comparison parameter, wherein the comparator is formed to output a first comparison signal when a predeterminable number of measurement values within a measurement interval falls below the comparison parameter, or to output a second comparison signal when the predeterminable number of measurement values within the measurement interval reaches or exceeds the comparison parameter, wherein the first comparison signal or the second comparison signal indicate the state parameter; and
  a determiner for determining the number of measurement values, wherein the measurement interval comprises a number of measurement values, and wherein the determiner for determining the number of measurement values is formed to determine the number of measurement values from a ratio of logarithms of an error probability of a measurement value and the maximum allowable error probability.

54. An apparatus for determining a state parameter of an object to be monitored, comprising:
  a provider for providing a plurality of measurement values, wherein the measurement values comprise information relating to the state parameter of the object to be monitored;
  a comparator for comparing the measurement values with a predeterminable comparison parameter, wherein the comparator is formed to output a first comparison signal when a predeterminable number of measurement values within a measurement interval falls below the comparison parameter, or to output a second comparison signal when the predeterminable number of measurement values within the measurement interval reaches or exceeds the comparison parameter, wherein the first comparison signal or the second comparison signal indicate the state parameter; and
  a determiner for determining the predeterminable number, wherein the determiner for determining the predeterminable number is formed to determine the predeterminable number in dependence on a standard deviation of the measurement values.

55. The apparatus according to claim 54, wherein the predeterminable number comprises a first predeterminable number and a second predeterminable number, wherein the determiner for determining the predeterminable number is formed to determine the first predeterminable number in dependence on a first standard deviation of the measurement values and to determine the second predeterminable number in dependence on a second standard deviation, wherein a first weighting point is associated to the first standard deviation and wherein a second weighting point is associated to the second standard deviation, wherein the comparator is formed to perform a plurality of comparisons, wherein the first or second weighting point is associated to every comparison, and to generate the first or the second comparison signal based on a sum of the weighting points.

56. An apparatus for determining a state parameter of an object to be monitored, comprising:
  a provider for providing a plurality of measurement values, wherein the measurement values comprise information relating to the state parameter of the object to be monitored;
  a comparator for comparing the measurement values with a predeterminable comparison parameter, wherein the comparator is formed to output a first comparison signal when a predeterminable number of measurement values within a measurement interval falls below the comparison parameter, or to output a second comparison signal when the predeterminable number of measurement values within the measurement interval reaches or exceeds the comparison parameter, wherein the first comparison signal or the second comparison signal indicate the state parameter;

wherein the state parameter indicates a driving situation of a vehicle, wherein the driving situation comprises a non-operated state and a driving state, wherein the first or second comparison signal indicates the non-operated state and wherein the other of the first or second comparison signal indicates the driving state;

wherein the apparatus is formed to change from the non-operated state to the driving state when a predetermined number of exceedings of a current difference square over a predetermined multiple of a short-term average value of the difference squares occurs within a predetermined number of measurements.

57. The apparatus according to claim 56, which is formed such that the multiple of the short-term average value is limited by a maximum value, to ensure that high pressure deviations in the non-operated state always lead to a transition to the driving state.

58. The apparatus according to claim 56, which is formed such that the multiple of the short-term average value is limited by a minimum value to ensure that low pressure deviations in the non-operated state do not lead to a transition to the driving state.

59. An apparatus for determining a state parameter of an object to be monitored, comprising:

a provider for providing a plurality of measurement values, wherein the measurement values comprise information relating to the state parameter of the object to be monitored;

a comparator for comparing the measurement values with a predeterminable comparison parameter, wherein the comparator is formed to output a first comparison signal when a predeterminable number of measurement values within a measurement interval falls below the comparison parameter, or to output a second comparison signal when the predeterminable number of measurement values within the measurement interval reaches or exceeds the comparison parameter, wherein the first comparison signal or the second comparison signal indicate the state parameter;

wherein the state parameter indicates a driving situation of a vehicle, wherein the driving situation comprises a non-operated state and a driving state, wherein the first or second comparison signal indicates the non-operated state and wherein the other of the first or second comparison signal indicates the driving state;

wherein the apparatus is formed such that a maintained value of a short-term average value of the difference squares is adapted to the proportionality of thermal noise to the absolute temperature when the noise causes the main portion of the measurement differences in the non-operated state, so that in a temperature increase the switching threshold, which defines the transition from the non-operated state to the driving state is raised in order to make the switching condition independent of the temperature.

60. An apparatus for determining a state parameter of an object to be monitored, comprising:

a provider for providing a plurality of measurement values, wherein the measurement values comprise information relating to the state parameter of the object to be monitored;

a comparator for comparing the measurement values with a predeterminable comparison parameter, wherein the comparator is formed to output a first comparison signal when a predeterminable number of measurement values within a measurement interval falls below the comparison parameter, or to output a second comparison signal when the predeterminable number of measurement values within the measurement interval reaches or exceeds the comparison parameter, wherein the first comparison signal or the second comparison signal indicate the state parameter; and determiner for determining and providing the predeterminable comparison parameter, wherein the determiner for determining the predeterminable comparison parameter is formed to output a multiple of an average value of the measurement values or a fraction of an average value of the measurement values as the predeterminable comparison parameter.

* * * * *